(12) United States Patent
Wakako et al.

(10) Patent No.: US 11,670,125 B2
(45) Date of Patent: Jun. 6, 2023

(54) MONITORING AREA SETTING DEVICE, MONITORING AREA SETTING METHOD, AND ALERT NOTIFICATION METHOD

(71) Applicant: PANASONIC I-PRO SENSING SOLUTIONS CO., LTD., Fukuoka (JP)

(72) Inventors: Takeshi Wakako, Fukuoka (JP); Masaki Yamaguchi, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 0 days.

(21) Appl. No.: 17/568,406

(22) Filed: Jan. 4, 2022

(65) Prior Publication Data

US 2022/0215706 A1 Jul. 7, 2022

(30) Foreign Application Priority Data

Jan. 6, 2021 (JP) .............................. JP2021-000940

(51) Int. Cl.
*G07C 9/25* (2020.01)
*G07C 9/29* (2020.01)
(Continued)

(52) U.S. Cl.
CPC ............ *G07C 9/257* (2020.01); *G06V 40/173* (2022.01); *G06V 40/50* (2022.01); *G07C 9/29* (2020.01);
(Continued)

(58) Field of Classification Search
CPC .. G06K 7/10366; G06V 40/173; G06V 40/50; G07C 9/257; G07C 9/27; G07C 9/29; G07C 9/38; G08B 13/19613
See application file for complete search history.

(56) References Cited

U.S. PATENT DOCUMENTS

2009/0057425 A1* 3/2009 Sullivan ................... F24F 11/63
715/764
2013/0283232 A1* 10/2013 Van Megchelen .... G06F 16/192
717/106
(Continued)

FOREIGN PATENT DOCUMENTS

JP 2020-119066 8/2020

*Primary Examiner* — Omer S Khan
(74) *Attorney, Agent, or Firm* — Greenblum & Bernstein, P.L.C.

(57) ABSTRACT

A monitoring area setting device includes a storage unit storing information of one area and card reader information of a card reader corresponding to the area, an input unit receiving an administrator operation, and a processor generating, based on the administrator operation, an access control rule including information of a monitoring area to be monitored by a camera in the area and person information of a person that allows access to the monitoring area. When the card reader information corresponding to the monitoring area is input, the processor generates the access control rule further including the card reader information. When the card reader information corresponding to the monitoring area is not input, card reader information of a virtual reader designated by the administrator operation for access to the monitoring area is generated, and the access control rule further including generated card reader information of the virtual reader is generated.

7 Claims, 14 Drawing Sheets

(51) Int. Cl.
*G06V 40/50* (2022.01)
*G06V 40/16* (2022.01)
*G08B 13/196* (2006.01)
*G06K 7/10* (2006.01)

(52) U.S. Cl.
CPC ... *G08B 13/19613* (2013.01); *G06K 7/10366* (2013.01)

(56) References Cited

U.S. PATENT DOCUMENTS

| | | | |
|---|---|---|---|
| 2017/0278325 A1* | 9/2017 | Simanek | G06Q 20/28 |
| 2017/0294089 A1* | 10/2017 | Miwa | G08B 25/005 |
| 2020/0234553 A1 | 7/2020 | Kamio et al. | |
| 2021/0209909 A1 | 7/2021 | Kamio et al. | |
| 2022/0284708 A1* | 9/2022 | Trundle | H04N 7/188 |

\* cited by examiner

FIG. 9

| | FACE IMAGE | NAME | CARD READER B | CARD READER C | VIRTUAL READER A |
|---|---|---|---|---|---|
| 1 | IM1 | AAA | ALL | ALL | ALL |
| 2 | IM2 | BBB | 8:00-22:00 | 8:00-22:00 | ALL |
| 3 | IM3 | CCC | 8:00-20:00 | 8:00-20:00 | 8:00-20:00 |

TB1

MONITORING AREA SETTING DEVICE, MONITORING AREA SETTING METHOD, AND ALERT NOTIFICATION METHOD

CROSS-REFERENCE TO RELATED APPLICATIONS

This application is based on and claims priority under 35 USC 119 from Japanese Patent Application No. 2021-000940 filed on Jan. 6, 2021, the contents of which are incorporated herein by reference.

TECHNICAL FIELD

The present disclosure relates to a monitoring area setting device, a storage medium having a monitoring area setting program, a monitoring area setting method, an alert notification program, and an alert notification method.

BACKGROUND ART

Patent Literature 1 discloses an information processing device that determines permission and non-permission of entry for a person with face image data in a zone. The information processing device receives the face image data from a camera that images a plurality of zones of a building, compares the face image data with registered face image data of a person permitted to enter each zone, and determines the permission and non-permission of entry of the person with the face image data based on a comparison result.

CITATION LIST

Patent Literature

Patent Literature 1: JP-2020-119066-A

However, in Patent Literature 1, in order to determine the permission and non-permission of entry, a card reader capable of acquiring the face image data must be installed, and it is not possible to determine the permission and non-permission of entry of entry of the person into the zone (for example, a room, an area, or the like) where the card reader is not installed. Therefore, when it is desired to determine the permission and non-permission of entry into the zone where the card reader is not installed, an administrator of the building needs to newly install a card reader, and the zone cannot be flexibly set without being affected by presence or absence of the card reader.

SUMMARY OF INVENTION

The present disclosure is made in view of the above circumstances, and an object of the present disclosure is to provide a monitoring area setting device, a monitoring area setting program, a monitoring area setting method, an alert notification program, and an alert notification method that enable flexible setting of a monitoring area and that more efficiently support a monitoring operation of an administrator.

The present disclosure provides a monitoring area setting device including: a storage unit that stores information of at least one area and card reader information of a card reader corresponding to the area; an input unit configured to receive an administrator operation; and a processor configured to, based on the administrator operation, generate an access control rule including information of a monitoring area to be monitored by at least one camera in the area and person information of at least one person that allows access to the monitoring area, in which the processor is configured to, when the card reader information corresponding to the monitoring area is input by the administrator operation, generate the access control rule further including the card reader information, and when the card reader information corresponding to the monitoring area is not input by the administrator operation, generate card reader information of a virtual reader designated by the administrator operation for access to the monitoring area, and generate the access control rule further including generated card reader information of the virtual reader.

The present disclosure provides a monitoring area setting method performed by a monitoring area setting device that is communicably connected to a computer that monitors a person accessing a monitoring area. The monitoring area setting method includes: receiving input of information of the monitoring area to be monitored by at least one camera, person information of at least one person that allows access to the monitoring area, and card reader information corresponding to the monitoring area; and when the card reader information is input, generating an access control rule further including the card reader information; and when the card reader information is not input, generating card reader information of a virtual reader designated by an administrator operation for access to the monitoring area and generating the access control rule further including generated card reader information of the virtual reader.

The present disclosure provides an alert notification method performed by a computer that is communicably connected to at least one camera that images a monitoring area. The alert notification method includes: acquiring an access control rule including information of the monitoring area to be monitored by the camera, person information and a face image of at least one person that allow access to the monitoring area, and card reader information corresponding to the monitoring area; when the access control rule includes card reader information of a virtual reader designated by an administrator operation for access to the monitoring area, acquiring a face image of the person accessing the monitoring area imaged by the camera; determining whether or not the acquired face image of the person is in the face image included in the access control rule; and when it is determined that the face image of the person is not in the face image included in the access control rule, outputting an alert indicating that a person that is not allowed to access the monitoring area is detected; and when the access control rule does not include the card reader information of the virtual reader, acquiring the face image of the person accessing the monitoring area that is imaged by the camera and that allows access by a card reader corresponding to the card reader information; determining whether or not the acquired face image of the person is in the face image included in the access control rule; and generating, when it is determined that the face image of the person is not in the face image included in the access control rule, an alert indicating that the person that is not allowed to access the monitoring area is detected, and outputting the alert.

The present disclosure provides an alert notification method performed by a computer that is communicably connected to at least one camera that images a monitoring area. The alert notification method includes: acquiring an access control rule including information of the monitoring area to be monitored by the camera, person information and a face image of at least one person that allow access to the monitoring area, and card reader information corresponding to the monitoring area; when the access control rule includes card reader information of a virtual reader designated by an administrator operation for access to the monitoring area, acquiring a face image of the person accessing the monitoring area imaged by the camera; determining whether or not the acquired face image of the person is in the face image included in the access control rule; and when it is determined that the face image of the person is not in the face image included in the access control rule, generating an alert indicating that the person that is not allowed to access to the monitoring area is detected, and outputting the alert; and when the access control rule does not include the card reader information of the virtual reader, reading the person information from a card held by a person accessing the monitoring area by a card reader corresponding to the card reader information; unlocking the card reader when the read person information is the person information included in the access control rule; acquiring a face image of the person accessing the monitoring area imaged by the camera; determining whether or not the acquired face image of the person is in the face image included in the access control rule; and when it is determined that the face image of the person is not in the face image included in the access control rule, generating an alert indicating that a person that is not allowed to access the monitoring area is detected, and outputting the alert.

According to the present disclosure, the monitoring area can be flexibly set and a monitoring operation of the administrator is more efficiently supported.

BRIEF DESCRIPTION OF DRAWINGS

FIG. 9 is a table showing an example of the access control rule for each person.

DESCRIPTION OF EMBODIMENTS

Hereinafter, embodiments specifically disclosing configurations and operations of a monitoring area setting device, a monitoring area setting program, a monitoring area setting method, an alert notification program, and an alert notification method according to the present disclosure will be described in detail with reference to the drawings as appropriate. However, unnecessarily detailed description may be omitted. For example, detailed description of a well-known matter or repeated description of substantially the same configuration may be omitted. This is to avoid unnecessary redundancy in the following description and to facilitate understanding for those skilled in the art. The accompanying drawings and the following description are provided for those skilled in the art to fully understand the present disclosure, and are not intended to limit the subject matter described in the claims.

Figure 1:
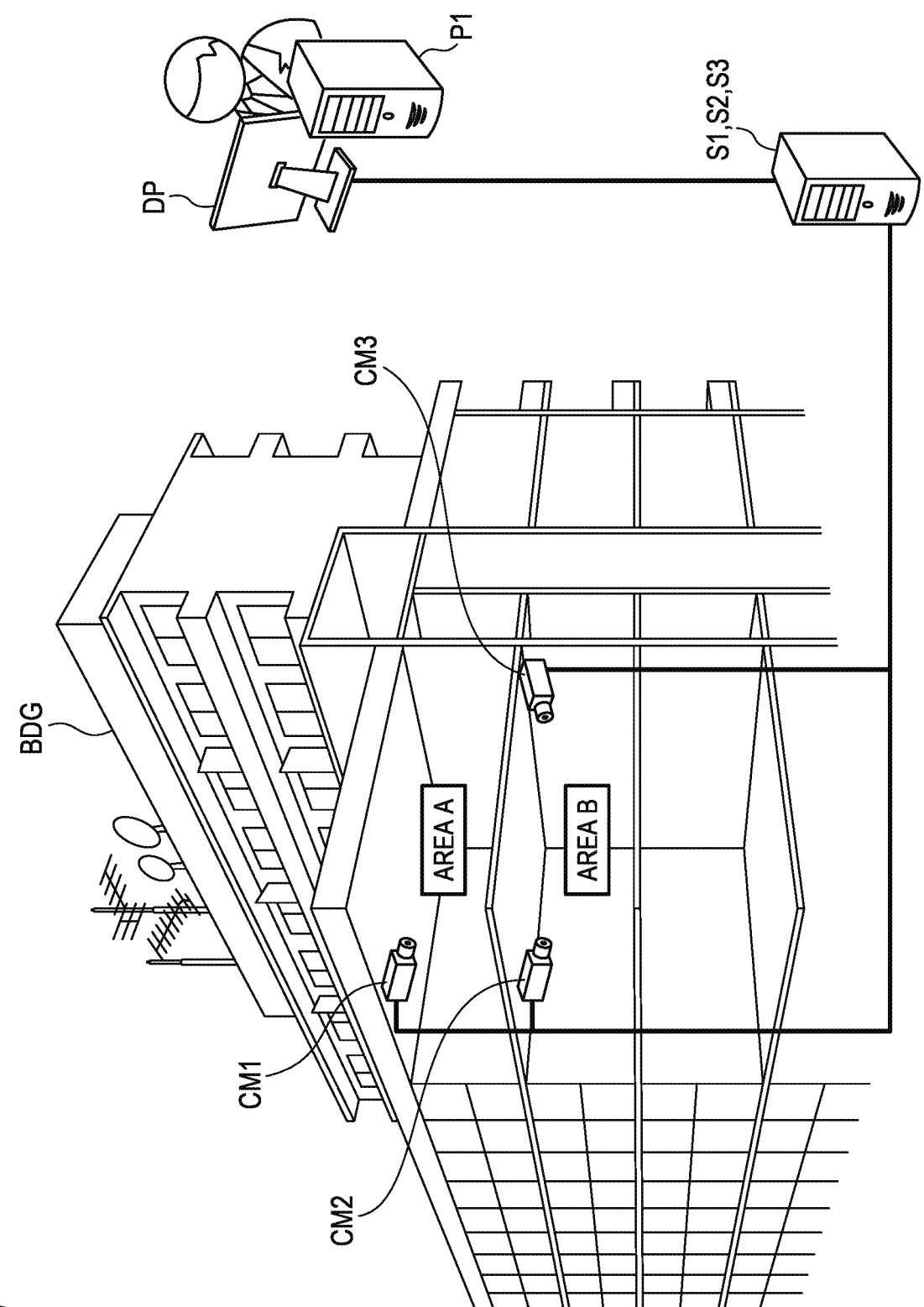
FIG. 1 is a diagram showing an example of a use case of a monitoring system according to a first embodiment.
Figure 2:
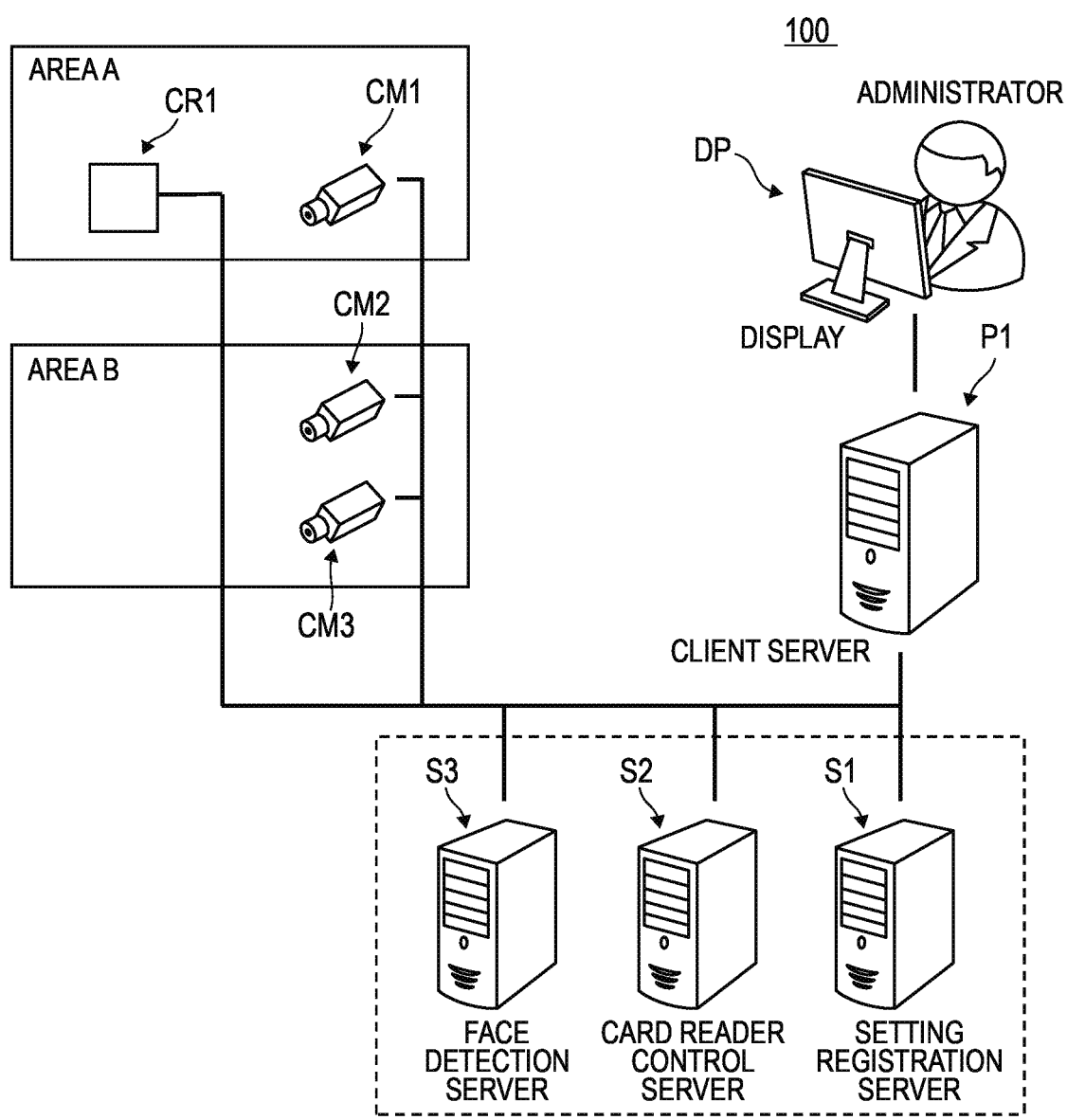
FIG. 2 is a diagram showing an example of an overall configuration of the monitoring system according to the first embodiment.

An example of a use case of a monitoring system 100 according to a first embodiment will be described with reference to FIGS. 1 and 2. FIG. 1 is a diagram showing the example of the use case of the monitoring system 100 according to the first embodiment. FIG. 2 is a diagram showing an example of an overall configuration of the monitoring system according to the first embodiment. It is needless to say that the use case of the monitoring system 100 shown in FIGS. 1 and 2 is merely an example, and the present invention is not limited thereto.

The monitoring system 100 images a person accessing an area as a monitoring target by a camera (that is, a monitoring camera) installed in the area based on an access control rule set in the area as the monitoring target (for example, a room, a corridor, a hall, an elevator, or the like in a building BDG) in the building BDG set by an administrator (for example, an employee or a monitoring person of a management company or a security company in the building BDG), and determines whether the imaged person has access permission to the area. When the monitoring system 100 determines that this person does not have the access permission as a result of determination, the monitoring system 100 generates an alert indicating a person that does not have the access permission is detected, and outputs the alert to a display DP of a terminal device (a client server P1 in the example shown in FIG. 1) operated by the administrator.

The monitoring system 100 includes the client server P1, a setting registration server S1, a card reader control server S2, a face detection server S3, and one or more cameras. The client server P1 and the display DP may be implemented by one terminal device such as a personal computer (PC), a tablet terminal, or a smartphone. Although an example in which the setting registration server S1, the card reader control server S2, and the face detection server S3 are separately configured is shown, the setting registration server S1, the card reader control server S2, and the face detection server S3 may be configured integrally.

Each of a plurality of cameras CM1, CM2, CM3, and so on is a so-called monitoring camera that is installed in an area as the monitoring target and images a person accessing the area. For example, in the example shown in FIGS. 1 and 2, the camera CM1 is installed in an "area A". Each of the plurality of cameras CM2 and CM3 is installed in an "area B". Each of the plurality of cameras CM1 and so on includes at least a lens (not shown) and an image sensor (not shown). The image sensor is a solid-state imaging device such as a charged-coupled device (CCD) or a complementary metal-oxide-semiconductor (CMOS), and converts an optical image formed on an imaging surface into an electrical signal.

Each of the plurality of cameras CM1 and so on is connected to the face detection server S3 so that the data communication is possible. Each of the plurality of cameras CM1 and so on detects a person from a captured image, generates a face cut-out image (an example of a face image) in which an area including a face of the detected person is cut out, and transmits the generated face cut-out image and camera information (for example, a camera name, camera identification information, a manufacturing number, an IP address, and the like) of an own camera in association with each other to the face detection server S3. When a plurality of persons appear in the captured image, each of the plurality of cameras CM1 and so on generates the face cut-out image in which the area including the face of the person is cut out.

A processing of detecting the face of the person from the captured image and a processing of generating the face cut-out image of the person may be executed by the face detection server S3. In such a case, the face detection server S3 acquires the captured image and the camera information of the camera imaging the captured image from each of the plurality of cameras CM1 and so on.

Each of a plurality of card readers CR1 and so on is installed near a door that allows access to the area, and manages a person accessing the area through this door. Each of the plurality of card readers CR1 and so on is a device capable of reading card information from a card such as an employee ID card or a passage permission card held by the person, and transmits read card information (for example, identification number assigned to the card, a name, a face image, an employee number, and the like of a holder that holds the card) and card reader information (for example, a card reader name, identification information of the card reader assigned to each card reader, and the like) in association with each other to the card reader control server S2. When each of the plurality of card readers CR1 and so on determines that the read card information belongs to the person that is permitted to access a corresponding area based on a control command transmitted from the card reader control server S2, each of the plurality of card readers CR1 and so on unlocks the door. On the other hand, when each of the plurality of card readers CR1 and so on determines that the read card information does not belong to the person that is permitted to access the corresponding area based on the control command transmitted from the card reader control server S2, the card reader CR1 maintains locking of the door (that is, the door is locked). For example, in the example shown in FIG. 2, the card reader CR1 is installed on the door that allows access to an area of the "area A".

The client server P1 as an example of the monitoring area setting device is connected to the setting registration server S1, the card reader control server S2, the face detection server S3, the cameras CM1 and so on, and the card readers CR1 and so on so that the data communication is possible. The client server P1 registers and manages various types of data in a database DB1 in the setting registration server S1 based on an administrator operation input via an operation unit IF (see FIG. 3) capable of receiving an operation by the administrator. In addition, the client server P1 generates each access control rule for each area based on the administrator operation, and registers a generated access control rule in the database DB1 of the setting registration server S1. In addition, the client server P1 outputs, to the display DP, an alert indicating that a person that does not have the access permission, which is transmitted from the face detection server S3, is detected.

The setting registration server S1 is connected to the client server P1, the card reader control server S2, and the face detection server S3 so that the data communication is possible. The setting registration server S1 registers (stores) various types of data transmitted from the client server P1 (for example, area information of an area, the card information, the card reader information, the access control rule set in the card reader, face images of a plurality of persons, and the like) in the database DB1. The setting registration server S1 may be configured integrally with the card reader control server S2 or the face detection server S3, or may be configured integrally with the card reader control server S2 and the face detection server S3.

The card reader control server S2 is connected to the client server P1, the setting registration server S1, and each of the plurality of card readers CR1 and so on so that the data communication is possible. The card reader control server S2 acquires the card information and the card reader information transmitted from each of the plurality of card readers CR1 and so on. The card reader control server S2 generates a control command for requesting the access control rule set in the acquired card reader information, and transmits a generated control command and the acquired card reader information in association with each other to the setting registration server S1. The card reader control server S2 determines, based on the access control rule transmitted from the setting registration server S1, whether the acquired card information (that is, whether a cardholder (person) indicated by the card information has the access permission) is in at least one piece of card information included in the access control rule associated with the card reader information. When the card reader control server S2 determines the acquired card information (that is, the cardholder (person) indicated by the card information has the access permission) is in one or more pieces of card information included in the access control rule associated with the card reader information, the card reader control server S2 generates a control command to unlock the door and transmits the control command to the card reader. Each of the plurality of card readers CR1 and so on unlocks the door based on the control command transmitted from the card reader control server S2.

The card reader control server S2 may store the access control rule corresponding to the card reader information of each of the card readers CR1 and so on. In this case, based on the card information and the card reader information transmitted from each of the plurality of card readers CR1 and so on, the card reader control server S2 executes a determination processing as to whether the person corresponding to the card information has the access permission.

In addition, the determination processing as to whether the person corresponding to the card information above has the access permission may be executed by the setting registration server S1. In this case, the card reader control server S2 transmits, to the setting registration server S1, the card information and the card reader information transmitted from each of the plurality of card readers CR1 and so on, and the control command for requesting determination as to whether the person indicated by the card information has the access permission in association with each other.

The face detection server S3 is connected to the client server P1, the setting registration server S1, and each of the plurality of cameras CM1 and so on so that the data communication is possible. The face detection server S3 acquires the face cut-out image and the camera information transmitted from each of the plurality of cameras CM1 and so on. The face detection server S3 generates a control command for requesting the access control rule set in an area corresponding to the acquired camera information, and transmits a generated control command and the acquired camera information in association with each other to the setting registration server S1. The face detection server S3 determines whether there is a face image identical or similar to the acquired face cut-out image (that is, whether the person corresponding to the face cut-out image has the access permission to the area) based on the access control rule transmitted from the setting registration server S1. When the face detection server S3 determines there is no face image identical or similar to the acquired face cut-out image (that is, the person corresponding to the face cut-out image does not have the access permission to the area), the face detection server S3 generates an alert indicating that the person that does not have the access permission is detected, and transmits the alert to the client server P1.

The face detection server S3 may store the access control rule of the area corresponding to the camera information of each of the cameras CM1 and so on. In this case, based on the camera information and the face cut-out image transmitted from each of the plurality of cameras CM1 and so on, the face detection server S3 executes a determination processing as to whether the person corresponding to the face cut-out image has the access permission.

In addition, the determination processing as to whether the person corresponding to the above face cut-out image has the access permission may be executed by the setting registration server S1. In this case, the face detection server S3 transmits, to the setting registration server S1, the camera information and the face cut-out image transmitted from each of the plurality of cameras CM1 and so on, and the control command for requesting determination as to whether the person indicated by the face cut-out image has the access permission in association with each other.

Figure 3:
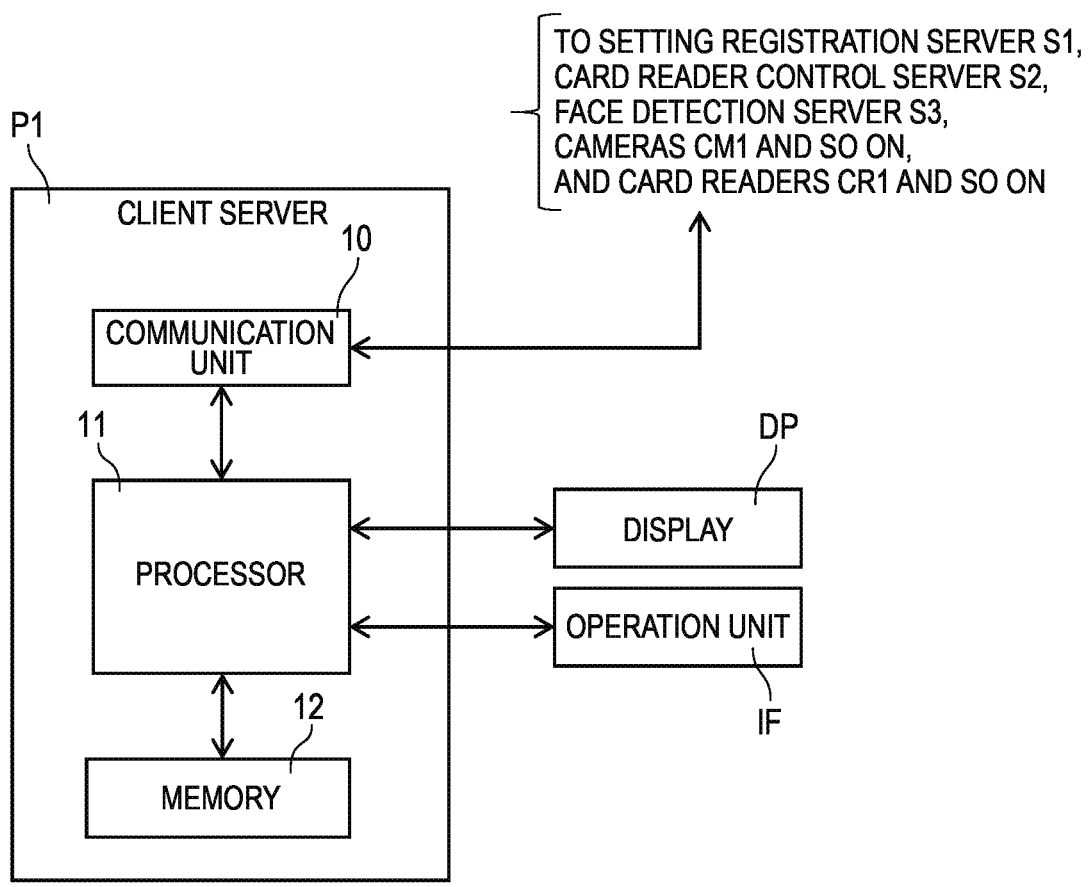
FIG. 3 is a diagram showing an example of an internal configuration of a client server according to the first embodiment.

Next, an internal configuration of the client server P1 according to the first embodiment will be described with reference to FIG. 3. FIG. 3 is a diagram showing an example of the internal configuration of the client server P1 according to the first embodiment.

The client server P1 includes a communication unit 10, a processor 11, and a memory 12. Although an example in which the client server P1 according to the first embodiment, and the display DP and the operation unit IF are separately configured is shown, the client server P1 may be configured to include the display DP and the operation unit IF to be integrally formed with the display DP and the operation unit IF.

The communication unit 10 is connected to the setting registration server S1, the card reader control server S2, the face detection server S3, each of the plurality of cameras CM1 and so on, and each of the plurality of card readers CR1 and so on so that the data communication is possible to execute data transmission and reception.

The processor 11 is configured with, for example, a central processing unit (CPU) or a field programmable gate array (FPGA), and performs various types of processing and control in cooperation with the memory 12. Specifically, the processor 11 refers to a program and data held in the memory 12, and executes the program to implement functions of respective units. The processor 11 generates an alert notification screen (for example, alert notification screens SC1 and SC2 shown in FIGS. 11 and 12) based on the alert transmitted from the face detection server S3, outputs the alert notification screen to the display DP, and displays the alert notification screen on the display DP.

The memory 12 as an example of a storage unit includes, for example, a random access memory (RAM) as a work memory used when each processing of the processor 11 is executed, and a read only memory (ROM) that stores a program and data defining an operation of the processor 11. The RAM temporarily stores data or information generated or acquired by the processor 11. The program defining the operation of the processor 11 is written in the ROM.

The display DP is configured with a display such as a liquid crystal display (LCD) or an organic electroluminescence (EL). The display DP displays a setting screen for setting the access control rule. The display DP displays the alert notification screen (for example, the alert notification screens SC1 and SC2 shown in FIGS. 11 and 12) generated by the client server P1.

The operation unit IF as an example of an input unit is, for example, a user interface that detects an input operation for the administrator to set the access control rule, and is configured with a mouse, a keyboard, a touch panel, or the like. The operation unit IF receives the input operation of the administrator, converts the input operation into electrical signals, and outputs the electrical signals to the processor 11.

Figure 4:
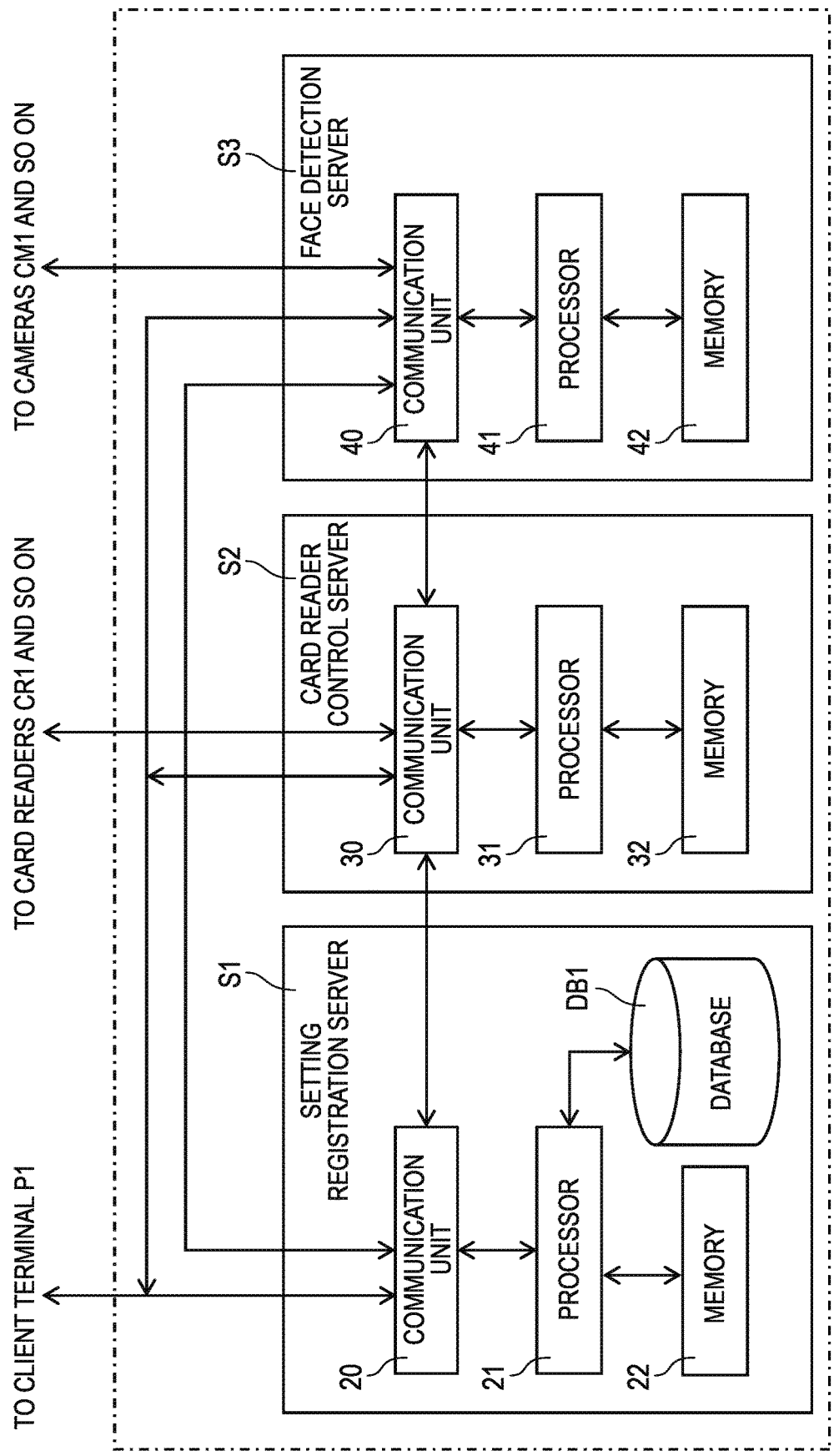
FIG. 4 is a diagram showing an example of internal configurations of a setting registration server, a card reader control server, and a face detection server according to the first embodiment.

FIG. 4 shows internal configurations of the setting registration server S1, the card reader control server S2, and the face detection server S3 according to the first embodiment. FIG. 4 is a diagram showing an example of the internal configurations of the setting registration server S1, the card reader control server S2, and the face detection server S3 according to the first embodiment.

The setting registration server S1 includes a communication unit 20, a processor 21, a memory 22, and the database DB1.

The communication unit 20 is connected to the client server P1, the card reader control server S2, and the face detection server S3 so that the data communication is possible to execute the data transmission and reception.

The processor 21 is configured with, for example, a CPU or an FPGA, and performs various types of processing and control in cooperation with the memory 22. Specifically, the processor 21 refers to a program and data held in the memory 22, and executes the program to implement functions of respective units.

The processor 21 registers (stores) the card reader information including the face image associated with the access control rule transmitted from the client server P1 in the database DB1. In addition, the processor 21 registers (stores) the card reader information associated with the access control rule transmitted from the client server P1, the area information, and the camera information in association with each other in the database DB1.

The processor 21 refers to the database DB1 based on the card reader information transmitted from the card reader control server S2, and extracts the access control rule set in the card reader information. The processor 21 transmits the extracted access control rule to the card reader control server S2.

In addition, the processor 21 refers to the database DB1 based on the camera information transmitted from the face detection server S3, and extracts the access control rule set in the area information associated with the camera information. The processor 21 transmits the extracted access control rule to the face detection server S3.

The memory 22 includes, for example, a RAM as a work memory used when each processing of the processor 21 is executed, and a ROM that stores a program and data defining an operation of the processor 21. The RAM temporarily stores data or information generated or acquired by the processor 21. The program defining the operation of the processor 21 is written in the ROM.

The database DB1 as an example of the storage unit includes a semiconductor memory such as a RAM and a ROM, and a storage device including any one of storage devices such as a solid state drive (SSD) and a hard disk drive (HDD). The database DB1 registers (stores) the card information transmitted from the client server P1 and person information (for example, the name, the employee number, or the face image of the holder that holds the card) corresponding to the card information in association with each other. In addition, the database DB1 registers (stores) the area information (for example, a name of the area, an identification number of the area, and the like) as information related to the building BDG, the camera information of the camera installed in each area, and the card reader information of the card reader installed in each area transmitted from the client server P1 in association with each other. Further, the database DB1 registers (stores) the access control rule transmitted from the client server P1.

Although an example in which the database DB1 is integrally configured with the setting registration server S1 is shown, the database DB1 and the setting registration server S1 may be separately configured. In such a case, the setting registration server S1 may be omitted. The database DB1 may be integrally configured with either the card reader control server S2 or the face detection server S3. In addition, when the database DB1 is configured separately from the setting registration server S1, the card reader control server S2, and the face detection server S3, the database DB1 may be connected to the client server P1, the card reader control server S2, and the face detection server S3 so that the data communication is possible to execute transmission and reception of various types of data. Further, although the database DB1 is one in the examples shown in FIGS. 1 and 2, a plurality of databases DB1 may be provided.

The card reader control server S2 includes a communication unit 30, a processor 31, and a memory 32.

The communication unit 30 is connected to the client server P1, the setting registration server S1, and each of the plurality of card readers CR1 and so on so that the data communication is possible to execute the data transmission and reception.

The processor 31 is configured with, for example, a CPU or an FPGA, and performs various types of processing and control in cooperation with the memory 32. Specifically, the processor 31 refers to a program and data held in the memory 32, and executes the program to implement functions of respective units. Based on the access control rule transmitted from the setting registration server S1, and based on the card reader information and the card information transmitted from the card reader, the processor 31 executes the determination processing as to whether the person corresponding to the card information has the access permission. When the processor 31 determines that the person corresponding to the card information has the access permission, the processor 31 unlocks the card reader, and when the processor 31 determines that the person corresponding to the card information does not have the access permission, the processor 31 leaves the lock of the card reader as it is.

The memory 32 includes, for example, a RAM as a work memory used when each processing of the processor 31 is executed, and a ROM that stores a program and data defining an operation of the processor 31. The RAM temporarily stores data or information generated or acquired by the processor 31. The program defining the operation of the processor 31 is written in the ROM. The memory 32 may store the area information and the access control rule corresponding to the card reader information.

The face detection server S3 includes a communication unit 40, a processor 41, and a memory 42.

The communication unit 40 is connected to the client server P1, the setting registration server S1, and each of the plurality of cameras CR1 and so on so that the data communication is possible to execute the data transmission and reception.

The processor 41 is configured with, for example, a CPU or an FPGA, and performs various types of processing and control in cooperation with the memory 42. Specifically, the processor 41 refers to a program and data held in the memory 42, and executes the program to implement functions of respective units. Based on the access control rule transmitted from the setting registration server S1, the processor 41 compares each of face images of persons that have the access permission with the face cut-out image transmitted from the camera, and executes the determination processing as to whether the person corresponding to the face cut-out image has the access permission. The processor 41 generates an alert when it is determined that the person corresponding to the face cut-out image does not have the access permission, and transmits the alert to the client server P1 via the communication unit 40.

Here, a comparison processing of the faces executed by the processor 41 above may be executed using learning data generated in advance. In such a case, the processor 41 may further include an AI processing unit (not shown). The AI processing unit is configured with, for example, a CPU, a digital signal processor (DSP), or an FPGA, and includes a learning model database that accumulates feature amount data of faces of face images of a plurality of persons stored in the past. The AI processing unit (not shown) executes the comparison processing of the faces based on the face cut-out image transmitted from the camera and the face images of the plurality of persons included in the access control rule.

The learning model database includes a semiconductor memory such as a RAM and a ROM, and a storage device including any one of storage devices such as an SSD and a HDD. In addition, the learning model database generates or stores, for example, a program defining the comparison processing executed by the AI processing unit, various types of setting data for executing these processing, learning data used when extracting and comparing feature amounts of the faces of the persons, or the like.

Learning for generating the learning data may be performed using one or more statistical classification techniques. The statistical classification technique includes, for example, linear classifiers, support vector machines, quadratic classifiers, kernel estimation, decision trees, artificial neural networks, Bayesian technologies and/or networks, hidden Markov models, binary classifiers, multi-class classifiers, a clustering technique, a random forest technique, a logistic regression technique, a liner regression technique, a gradient boosting technique, or the like. However, the statistical classification technique to be used is not limited thereto.

The memory 42 includes, for example, a RAM as a work memory used when each processing of the processor 41 is executed, and a ROM that stores a program and data defining an operation of the processor 41. The RAM temporarily stores data or information generated or acquired by the processor 41. The program defining the operation of the processor 41 is written in the ROM. The memory 42 may store the area information and the access control rule corresponding to the camera information. In addition, the memory 42 may store the learning data used in the comparison processing of the faces.

Figure 5:
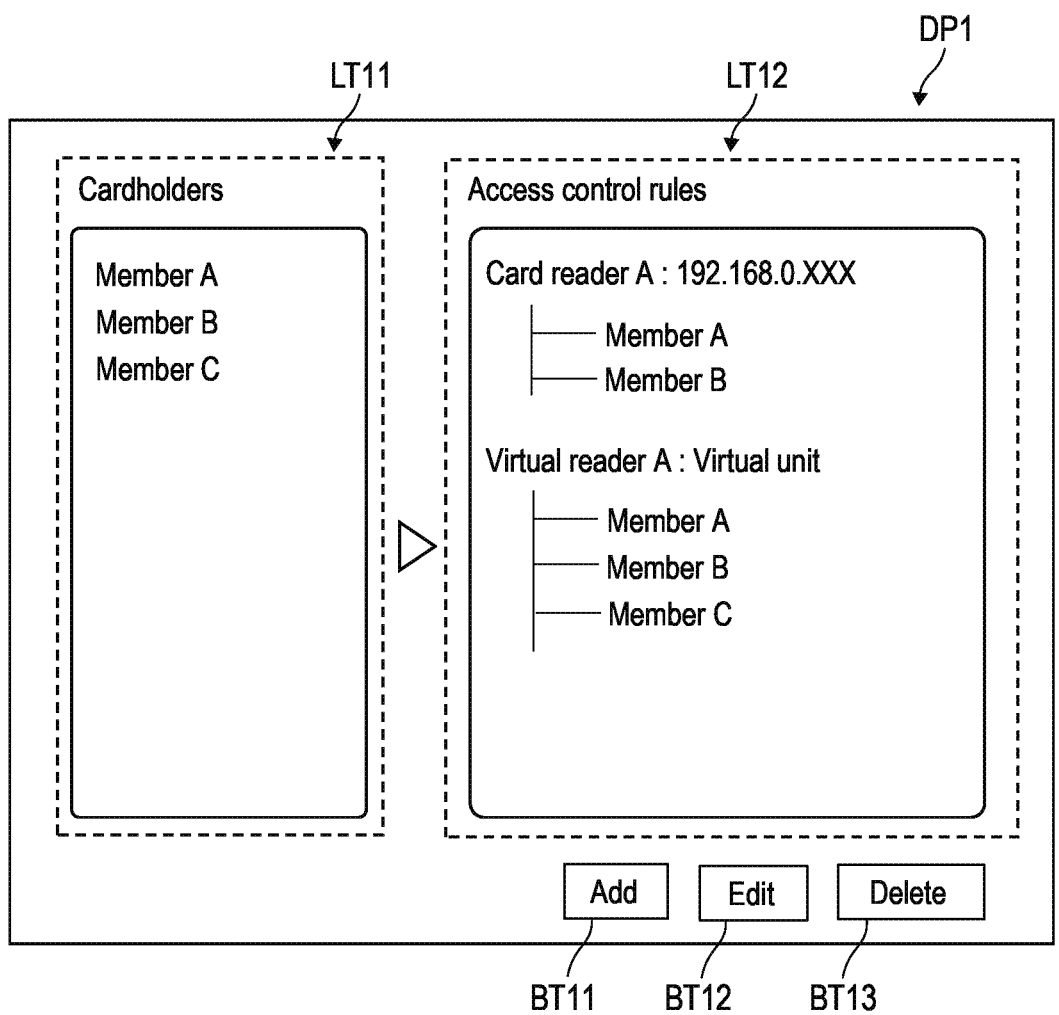
FIG. 5 is a diagram showing an example of a first setting screen of an access control rule.
Figure 6:
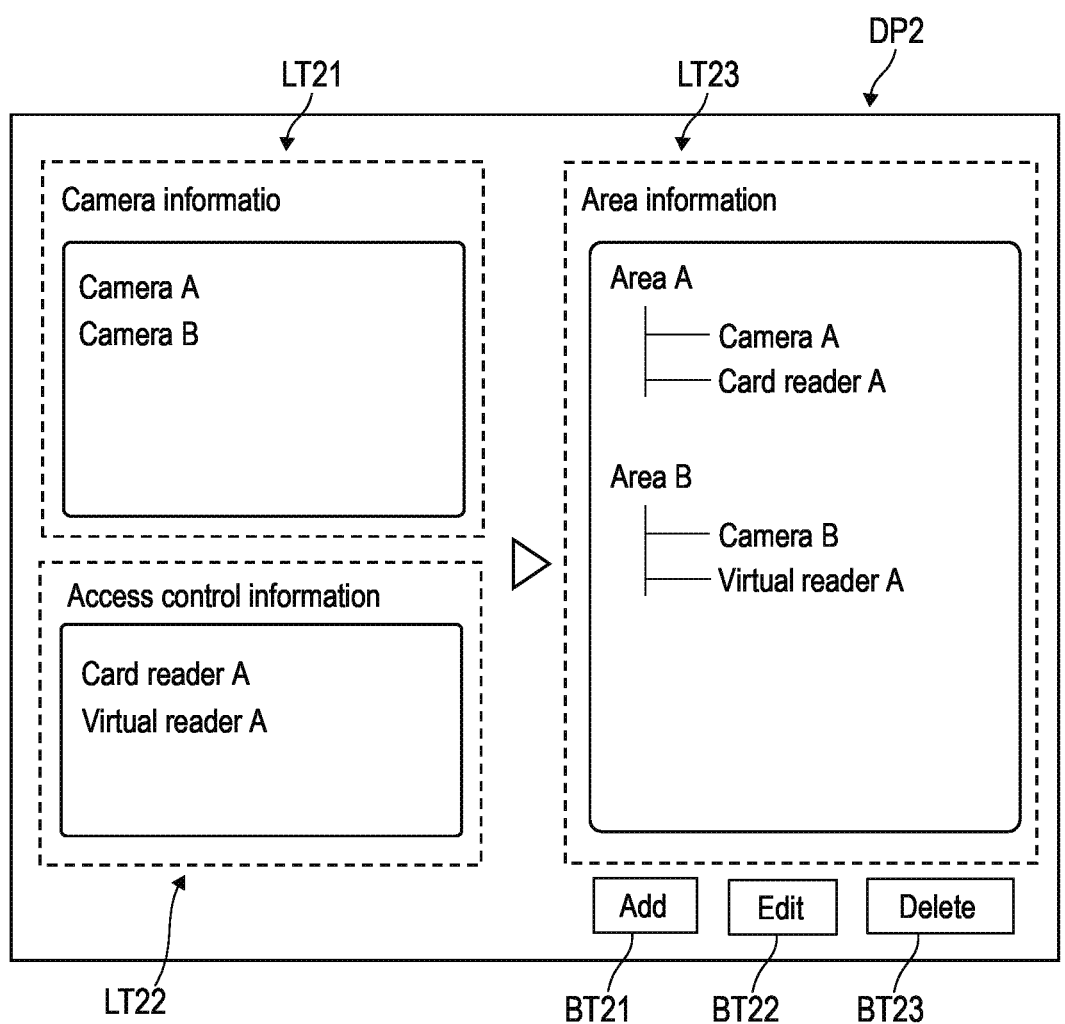
FIG. 6 is a diagram showing an example of the first setting screen of the access control rule.

Examples of the setting screen of the access control rule displayed on the display DP will be described with reference to FIGS. 5 and 6. FIG. 5 is a diagram showing an example of a first setting screen DP1 of the access control rule. FIG. 6 is a diagram showing an example of a first setting screen DP2 of the access control rule. It is needless to say that the first setting screens DP1, DP2 of the access control rule shown in FIGS. 5 and 6 are merely examples, and the present invention is not limited thereto.

The first setting screen DP1 of the access control rule is a screen for generating and setting the access control rule for each card reader. The first setting screen DP1 of the access control rule is generated by the client server P1 when the administrator receives a generating or editing (changing) operation of the access control rule, and is displayed on the display DP. The first setting screen DP1 is generated including a cardholders list LT11, an access control rules list LT12, an add button BT11, an edit button BT12, and a delete button BT13.

Here, a method of generating the access control rule based on the administrator operation will be described with reference to the first setting screen DP1. When the add button BT11 is selected (pressed) by the administrator, the client server P1 receives an adding operation of the card reader information as a setting target of the access control rule. Here, the client server P1 receives a designation operation (not shown) of any one of each of the plurality of card readers CR1 and so on installed in the building BDG or a virtual card reader (hereinafter referred to as a "virtual reader") as the card reader information as the setting target of the access control rule. The virtual reader referred to here is a card reader that is virtually installed at the door or an entrance of the area where the card reader is not actually installed when an area where the card reader is not installed is the monitoring target. The client server P1 adds the designated card reader or virtual reader in the access control rules list LT12 and displays the designated card reader or virtual reader. The access control rules list LT12 displays the access control rule set for each piece of card reader information of the card reader or the virtual reader.

When the administrator selects (presses) the edit button BT12, the client server P1 starts receiving an editing operation of the access control rule set in one or more pieces of card reader information currently displayed in the access control rules list LT12.

The client server P1 receives a designation operation of the person (cardholder) that has the access permission with the card reader or the virtual reader with each piece of the card reader information displayed in the access control rules list LT12 in association with each other. For example, in the access control rules list LT12 in the example shown in FIG. 5, one card reader indicated by the card reader information "card reader A: 192.168.0.XXX" and one virtual reader indicated by the card reader information "virtual reader A: virtual unit" are displayed. In such a case, the client server P1 receives a designation operation of a person (cardholder) whose access is desired to be permitted by one card reader indicated by the "card reader A: 192.168.0.XXX" and a designation operation of a person (cardholder) whose access is desired to be permitted by one virtual reader indicated by the card reader information "virtual reader A: virtual unit". The card reader information of the virtual reader may be any virtual reader name set by the administrator operation, or may be the area information, door information, or the like of an area where the virtual reader is virtually installed. In addition, an example in which a name of a person as the person information of the person that holds the card (that is, the cardholder) as the card information is associated with the card reader information here is shown, but it may be the card information or the face image of the person that holds the card.

When one of the one or more cardholders included in the cardholders list LT11 is selected by the administrator operation and is subjected to a drag operation of being dragged to a neighboring region of any piece of the card reader information in the access control rules list LT12, the client server P1 sets the cardholder that is subjected to the drag operation as the cardholder that has the access permission with the corresponding card reader information.

Here, in the cardholders list LT11 in the first setting screen DP1, the card information that permits access by the card reader and cardholder (person) information of the cardholder that holds the card as the person information that permits access by the card reader is displayed in a list. The cardholder (person) information displayed in the cardholders list LT11 is associated with the card information. For example, the cardholders list LT11 in the first setting screen DP1 shows an example in which three names indicated by "member A", "member B", and "member C" are displayed as the cardholder (person) information. The information displayed in the cardholders list LT11 is not limited to the cardholder (person) information, and may be, for example, a face image as the cardholder (person) information.

The client server P1 performs a tree display of putting the cardholder that has the access permission with the card reader information under the card reader information, and visualizes the access control rule set for each card reader.

In the access control rules list LT12 in the example shown in FIG. 5, two access control rules set based on the administrator operation are displayed. The card reader indicated by the card reader information "card reader A: 192.168.0.XXX" is set with the access control rule that permits access of two persons indicated by the cardholder information "member A" and "member B" as the card information and the person information. The virtual reader indicated by the card reader information "virtual reader A: virtual unit" is set with the access control rule that permits access of three persons indicated by the cardholder information "member A", "member B", and "member C" as the card information and the person information.

Although an illustration is omitted in the first setting screen DP1 shown in FIG. 5, when any one piece of the cardholder information and the card reader information is selected by the administrator operation, the client server P1 may set a more detailed access control rule such as a date and time, a time period, and the like that permit access, for example.

When the delete button BT13 is selected (pressed) by the administrator, the client server P1 executes a deletion processing of deleting the access control rule set in any of the currently selected card reader information or the cardholder information included in the access control rule.

The first setting screen DP2 of the access control rule is a screen for setting (applying) the generated access control rule in the card reader information on the first setting screen DP1 to the area as the monitoring target with the generated access control rule, the camera information of the camera, and the area information of the area that allows access by the card reader in association with each other. The first setting screen DP2 is generated by the client server P1 when the administrator receives a setting operation or an ending operation of the access control rule in the first setting screen DP1, and is displayed on the display DP. The first setting screen DP2 is generated including a camera information list LT21, an access control rules list LT22, an area information list LT23, an add button BT21, an edit button BT22, and a delete button BT23.

When the add button BT21 is selected (pressed) by the administrator, the client server P1 receives an adding operation of the area. Here, the client server P1 receives a designation operation (not shown) of the area as the monitoring target among a plurality of areas in the building BDG as the area information as the setting target of the camera or the access control rule. The client server P1 adds the area information of the designated area in the area information list LT23 and displays the area information. The area information list LT23 displays the camera information of the camera installed so as to be able to image the person accessing the area and the access control rule set (applied) in each area.

When the administrator selects (presses) the edit button BT22, the client server P1 starts receiving an editing operation of the camera information and the access control rule set for each area currently displayed in the area information list LT23.

The client server P1 receives a designation operation of the camera that monitors (images) the area corresponding to the area information and the access control rule set in the area with one or more pieces of the area information displayed in the area information list LT23 in association with each other. For example, in the area information list LT23 in the example shown in FIG. 6, the camera information and the access control rule set in the two areas indicated by the area information "area A" and "area B" is displayed. In such a case, the client server P1 receives a designation operation of the camera information for monitoring (imaging) the area indicated by "area A" and a designation operation of the card reader information (that is, the access control rule) for managing the access to the area.

When any one piece of the one or more pieces of camera information included in the camera information list LT21 is selected and subjected to a drag operation of being dragged to a neighboring region of any piece of the area information in the area information list LT23 by the administrator operation, the client server P1 sets the camera information that is subjected to the drag operation as the camera that monitors (images) the area indicated by corresponding area information. When any one piece of the one or more pieces of card reader information included in the access control rules list LT22 is selected and subjected to a drag operation of being dragged to a neighboring region of any piece of the area information in the area information list LT23 by the administrator operation, the client server P1 sets the access control rule set in the card reader information that is subjected to the drag operation as the access control rule to be applied to the corresponding area information.

Here, in the camera information list LT21 on the first setting screen DP2, the camera information corresponding to each of a plurality of cameras installed in the building BDG is displayed in a list. For example, the camera information list LT21 on the first setting screen DP2 shows an example in which camera information indicated by two cameras of "camera A" and "camera B" is displayed.

In addition, in the access control rules list LT22, each of the card reader information set with the access control rule in the access control rules list LT12 on the first setting screen DP1 is displayed in a list. In addition, in the access control rules list LT22 of the first setting screen DP2, each of the card reader information "card reader A" and "virtual reader A" set with the access control rule in the access control rules list LT12 on the first setting screen DP1 is displayed in a list.

The client server P1 performs a tree display of putting the camera information and the access control rule corresponding to the card reader information set for the area information set based on the administrator operation under the area information, and visualizes the currently set camera information and card reader information.

For example, in the area information list LT23 in the example shown in FIG. 6, the camera information and the card reader information (that is, the access control rule) set in the two areas are displayed based on the administrator operation. The area indicated by the area information "area A" is monitored (imaged) by a camera indicated by the camera information "camera A", the access of the person is managed by the card reader information "card reader A", and the access control rule set in the card reader information is applied. The area indicated by the area information "area B" is monitored (imaged) by the camera indicated by the camera information "camera B", the access of the person is managed by the card reader information "virtual reader A", and the access control rule set in the card reader information is applied. As described above, the client server P1 sets the access control rule for each area based on the administrator operation.

When the delete button BT23 is selected (pressed) by the administrator, the client server P1 executes a deletion processing of any one piece of the camera information, the card reader information, and the area information currently selected.

Figure 7:
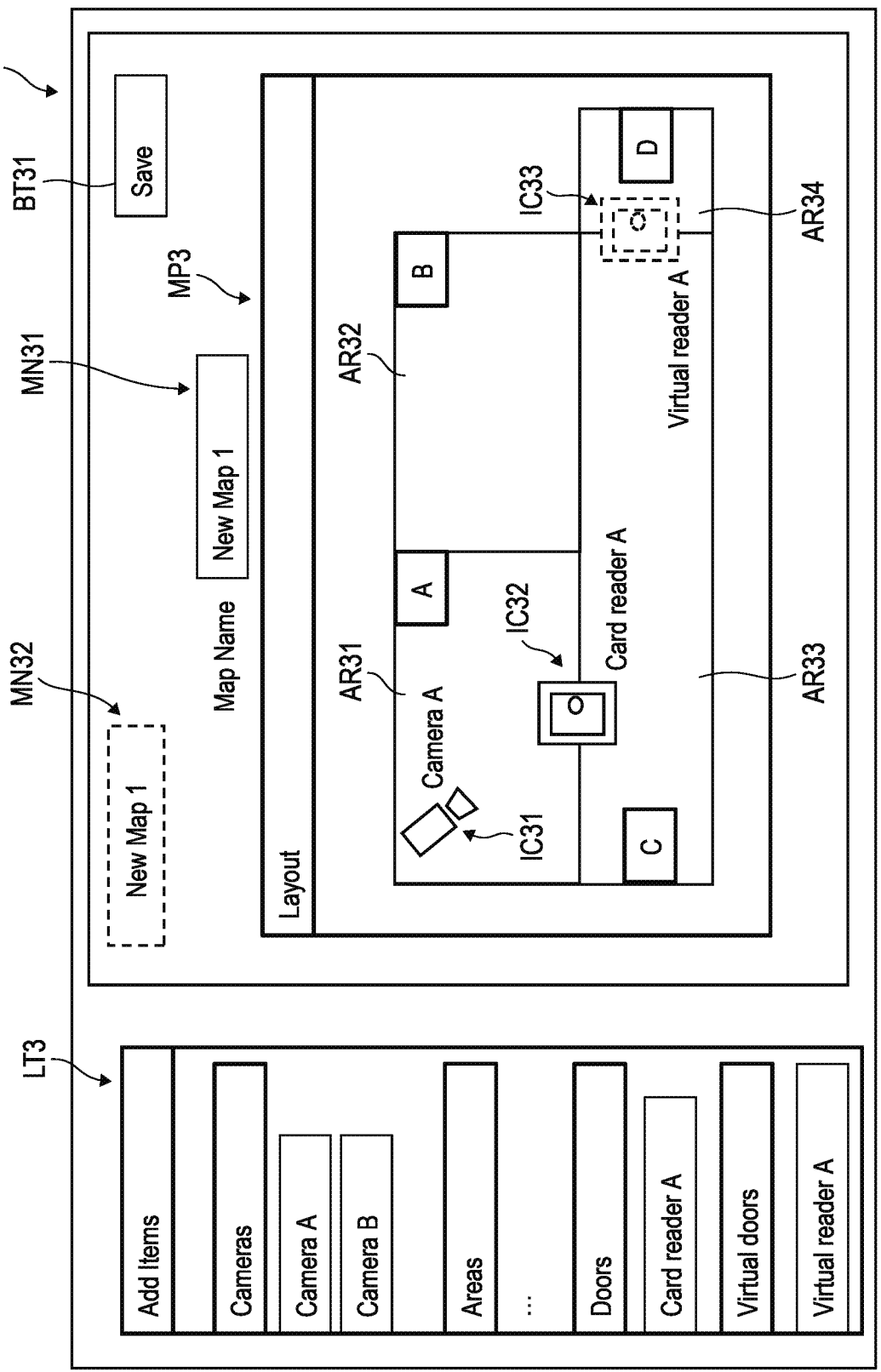
FIG. 7 is a diagram showing an example of a second setting screen of the access control rule.

Next, an example of another setting screen of the access control rule displayed on the display DP will be described with reference to FIG. 7. FIG. 7 is a diagram showing an example of a second setting screen DP3 of the access control rule. It is needless to say that the second setting screen DP3 of the access control rule shown in FIG. 7 is merely an example, and the present invention is not limited thereto.

The second setting screen DP3 of the access control rule is a screen for generating and setting the access control rule by arranging a camera, a card reader, a virtual reader, or the like on a layout image such as a floor map or an area map in the building BDG. The second setting screen DP3 of the access control rule is generated by the client server P1 when the administrator receives a generating or editing (changing) operation of the access control rule, and is displayed on the display DR The second setting screen DP3 is generated including an add items list LT3, a floor map image MP3, a map name setting field MN31, and a save button BT31. A map name MN32 may be omitted.

Here, the method of generating the access control rule based on the administrator operation will be described with reference to the second setting screen DP3. The access control rule described with reference to FIG. 7 shows an example of generating the access control rule with the camera that monitors (images) the area and the card reader or the virtual reader that allows access to the area in association with each other for at least one piece of area information included in a floor map image MP3.

The method of generating the access control rule described in the second setting screen DP3 shown in FIG. 7 shows an example in which the person information, the card reader information, or the like that permits access by the card reader information corresponding to the card reader or virtual reader is set in advance, and division of each area (creation of floor map data) is performed in advance on a floor map. Similarly, although an illustration is omitted in the second setting screen DP3 shown in FIG. 7, the client server P1 may set a more detailed access control rule such as the person information, or a date and time, a time period, and the like that permit access for each card information by the administrator operation.

In the second setting screen DP3, the client server P1 acquires the floor map data for generating the access control rule, and generates the floor map image MP3 based on the acquired floor map data and displays the floor map image MP3 based on the administrator operation. The client server P1 sets the access control rule applied to each area based on the area of the displayed floor map image MP3 and the camera information and the card reader information disposed in each area.

Specifically, the client server P1 receives a selecting operation of an item (for example, the camera information, the card reader information of the card reader or the virtual reader, or the like) that can be set or disposed on the floor map image MP3 included in the add items list LT3 by the administrator. The division of each area and the area information on the floor map image MP3 here may be set in advance, or the area information may be set for any range on the floor map image MP3 designated by the administrator operation. The floor map image MP3 in the second setting screen DP3 shown in FIG. 7 shows an example in which an area AR31 indicated by "A", an area AR32 indicated by "B", an area AR33 indicated by "C", and an area AR34 indicated by "D" are set.

The item designated by the administrator is selected and dragged to the floor map image MP3, and the client server P1 generates an icon corresponding to the item at a position of a drag destination, and displays the icon in a superimposed manner on the floor map image MP3. Specifically, the client server P1 generates a camera icon IC31 when the camera information is selected as the item, generates a door icon IC32 when the card reader information is selected as the item, generates a virtual door icon IC33 when the virtual reader information is selected as the item, and displays the camera icon IC31, the door icon IC32, or the virtual door icon IC33 on the floor map image MP3 in a superimposed manner. Accordingly, the administrator can visually confirm the camera information and the card reader information set in each area. For example, in the floor map image MP3 shown in FIG. 7, the administrator can intuitively grasp that one camera indicated by the camera information "camera A" and the camera icon IC31 and one card reader indicated by the card reader information "card reader A" and the door icon IC32 are set in the area AR31 indicated by "A", and one card reader indicated by the card reader information "virtual reader A" of the virtual reader and the virtual door icon IC33 is set in the area AR33 indicated by "C".

The client server P1 sets a character string input to the map name setting field MN31 by the administrator as a map name of the floor map image MP3. In addition, the client server P1 displays the map name input in the map name setting field MN31 in the map name MN32.

When the save button BT31 is selected by the administrator operation, the client server P1 transmits the area information for each area included in the current floor map image MP3, the camera information, and the card reader information (that is, the access control rule) in association with each other to the setting registration server S1 to be saved (stored).

Figure 8:
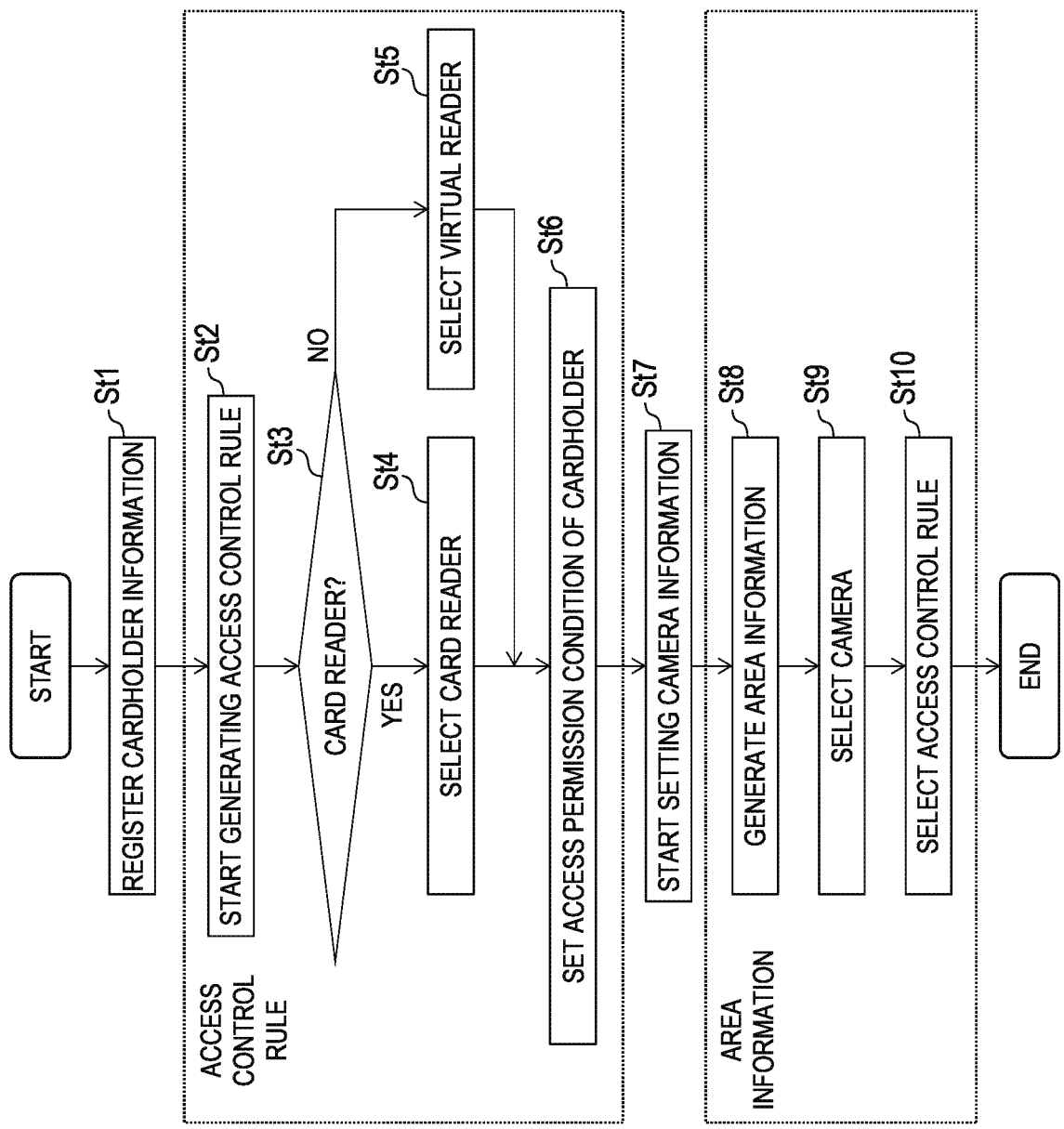
FIG. 8 is a flowchart showing an example of a generation procedure of the access control rule by the client server according to the first embodiment.

Here, a generation procedure of the access control rule will be described with reference to a flowchart shown in FIG. 8. FIG. 8 is the flowchart showing an example of the generation procedure of the access control rule by the client server P1 according to the first embodiment.

The client server P1, based on an administrator operation, registers (stores) the card information read by the card readers CR1 and so on and the cardholder information of the card corresponding to the card information (for example, the face image, the name, the employee number, and the like of the cardholder (person)) in association with each other in the database DB1 in the setting registration server S1 (St1).

The client server P1, based on an administrator operation, starts generating the access control rule (St2), generates a setting screen (for example, the first setting screen DP1 shown in FIG. 5, the second setting screen DP3 shown in FIG. 7, or the like) on which the access control rule can be generated, and displays the setting screen on the display DP. The client server P1 starts receiving an input operation on the setting screen on which the access control rule can be generated by the administrator via the operation unit IF. Here, the generation procedure of the access control rule when the first setting screen DP1 shown in FIG. 5 is displayed will be described.

The client server P1 receives a drag operation of the cardholder information to the access control rules list LT12 by the administrator. The cardholder information referred to here is used as the card information and the person information. The client server P1 determines whether dragged cardholder information is moved to a neighboring region corresponding to any piece of the card reader information included in the access control rules list LT12 (that is, a selection region for setting as card reader information that permits access of a dragged cardholder) (St3).

When the client server P1 determines that there is card reader information corresponding to a position of the dragged cardholder information in the processing of step St3 (St3, YES), the client server P1 selects the card reader indicated by the card reader information (St4), and generates the access control rule that permits access of the cardholder subjected to the drag operation in a selected card reader.

On the other hand, when the client server P1 determines that there is no card reader information corresponding to the position of the dragged cardholder information in the processing of step St3 (St3, NO), the client server P1 generates the card reader information of the virtual reader, selects the virtual reader indicated by the card reader information (St5), and generates the access control rule that permits access of the dragged cardholder in a selected virtual reader.

The client server P1 sets an access permission condition corresponding to the cardholder information set in the card reader information based on the administrator operation (St6). The access permission condition referred to here is, for example, a condition such as a date and time, a time period, or the like that permit access, which is set for each cardholder as shown in a table TB1 shown in FIG. 9.

As described above, the client server P1 completes setting of the access control rule for each card reader or each virtual reader. Accordingly, the client server P1 according to the first embodiment can set a predetermined access control rule even at a door or a doorway where the card reader is not installed. Next, the client server P1 sets an area to which the set access control rule for each card reader or virtual reader is applied.

The client server P1 starts receiving a setting operation of the camera information by the administrator (St7), generates, for example, the first setting screen DP2 shown in FIG. 6, and displays the first setting screen DP2 on the display DP. The client server P1, based on an administrator operation, generates the area information (for example, the area information "area A" and "area B" shown in FIG. 6) to which the access control rule is to be applied in the area information list LT23 (St8).

The client server P1 receives selection of the camera that monitors (images) an area corresponding to the generated area information by an administrator operation (St9). The client server P1 sets selected camera information subjected to the drag operation as the camera that monitors (images) an area of a drag destination.

In addition, the client server P1 receives selection of the access control rule (that is, the card reader information) applied to the area corresponding to the generated area information by an administrator operation (St10). The client server P1 sets a selected access control rule (card reader information) subjected to the drag operation as a corresponding access control rule (card reader information) applied to the area information of the drag destination.

As described above, the client server P1 generates the access control rule for each area. The client server P1 transmits the generated access control rule to the setting registration server S1, and registers (stores) the generated access control rule in the database DB1. Accordingly, even in the area where the card reader is not installed, the client server P1 according to the first embodiment can set the access control rule related to the person accessing the area. That is, the client server P1 according to the first embodiment can set the predetermined access control rule for the area where the card reader is not installed as the monitoring target monitored by the camera.

Figure 10:
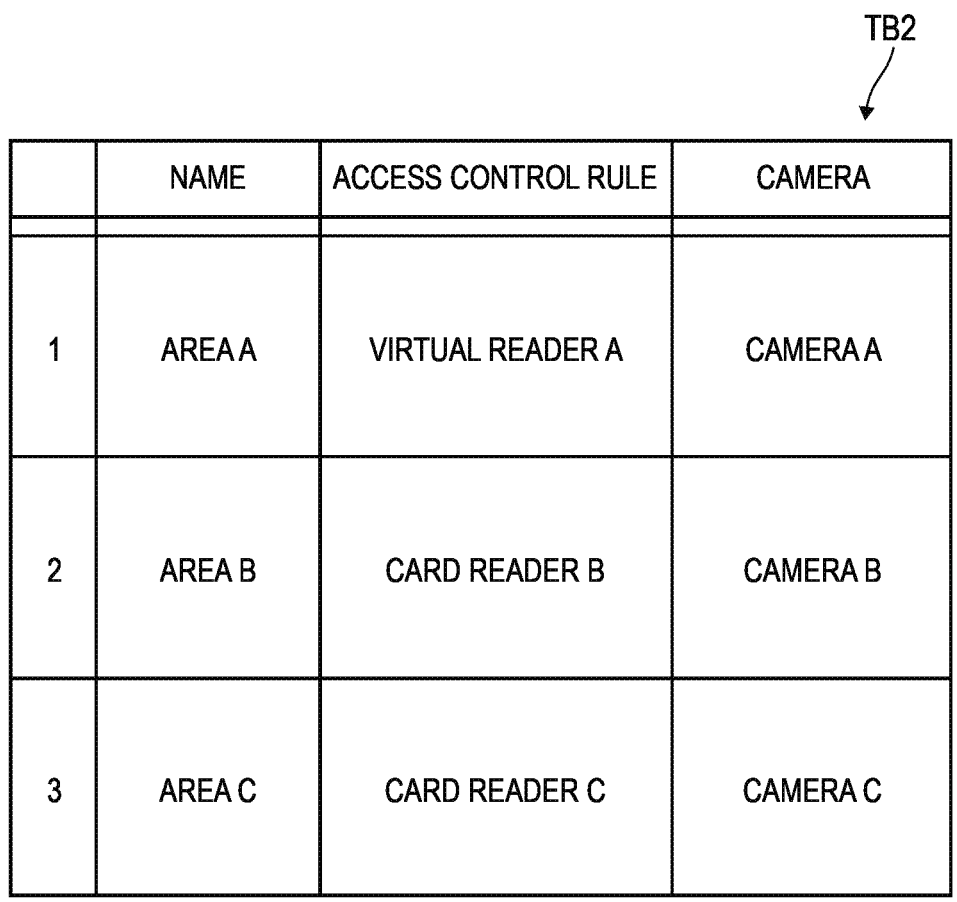
FIG. 10 is a table showing an example of the access control rule for each area.

Next, the access control rule when the access permission condition is set will be described with reference to FIGS. 9 and 10. FIG. 9 is the table TB1 showing an example of the access control rule for each person. FIG. 10 is a table TB2 showing an example of the access control rule for each area.

The table TB1 shown in FIG. 9 indicates access permission conditions of three persons set in two card readers "card reader B" and "card reader C", and one virtual reader "virtual reader A". In the example shown in FIG. 9, the two card readers "card reader B" and "card reader C", and one virtual reader "virtual reader A" are set with access control rules related to three persons corresponding to face images IM1, IM2, and IM3 as the card information and the person information. The access control rules of the two card readers "card reader B" and "card reader C", and one virtual reader "virtual reader A" are generated by the client server P1 and registered (stored) in the database DB1 in the setting registration server S1. The table TB1 may be registered (stored) in the database DB1 in association with the table TB2 shown in FIG. 10.

A person with the face image IM1 has a name "AAA", and access is permitted in all time periods (that is, 24 hours) in each of the "card reader B", the "card reader C", and the "virtual reader A" as the access permission conditions. A person with the face image IM2 has a name "BBB", and access is permitted in a time period "8:00 to 22:00" in the "card reader B", in the time period "8:00 to 22:00" in the "card reader C", and in all time periods (that is, 24 hours) in the "virtual reader A" as the access permission conditions. A person with the face image IM3 has a name "CCC", and access is permitted in a time period "8:00 to 20:00" in the "card reader B", in the time period "8:00 to 20:00" in the "card reader C", and in the time period "8:00 to 20:00" in the "virtual reader A" as the access permission conditions.

The table TB2 shown in FIG. 10 indicates setting of an area to which the access control rule set for each of the two card readers "card reader B" and "card reader C", and one virtual reader "virtual reader A" shown in the table TB1 of FIG. 9 is applied and a camera that monitors (images) the area. Each of the camera information "camera A", "camera B", and "camera C" shown in FIG. 10 is an example of the camera name, but the camera information may be an IP address of the camera, an ID of the camera assigned to each camera, or the like.

In the example shown in FIG. 10, for the "area A", monitoring (imaging) of the person accessing the "area A" is performed by the "camera A", and the access control rule set in the "virtual reader A" is applied. For the "area B", monitoring (imaging) of the person accessing the "area B" is performed by the "camera B", and the access control rule set in the "card reader B" is applied. For the "area C", monitoring (imaging) of the person accessing the "area C" is performed by the "camera C", and the access control rule set in the "card reader C" is applied.

Figure 11:
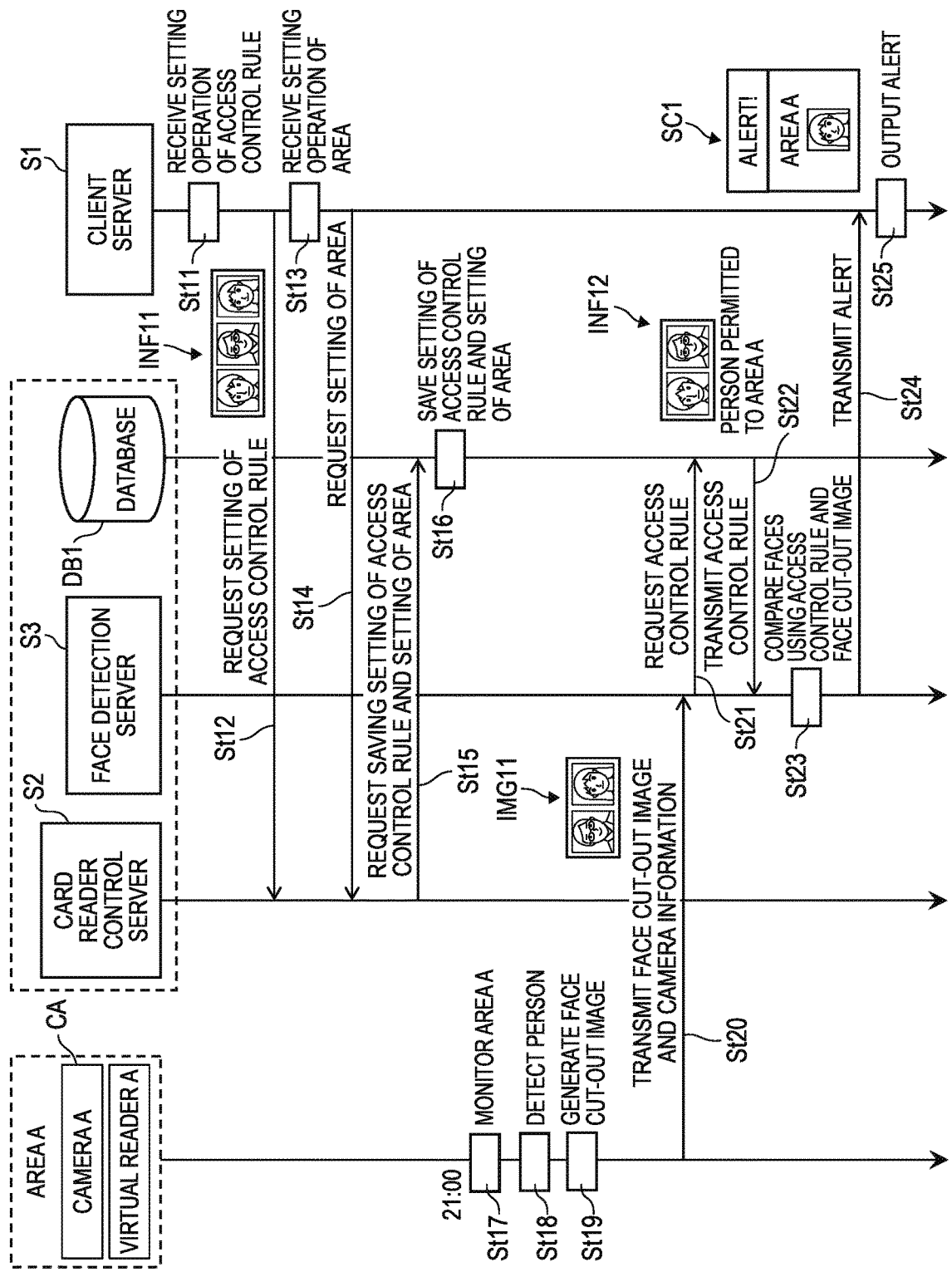
FIG. 11 is a sequence diagram showing an example of an operation procedure of the monitoring system according to the first embodiment.

Next, an operation procedure of the monitoring system 100 will be described with reference to FIG. 11. FIG. 11 is a sequence diagram showing an example of the operation procedure of the monitoring system 100 according to the first embodiment. The operation procedure of the monitoring system 100 described with reference to FIG. 11 will be described as an example of the operation procedure of the monitoring system 100 when the access control rule shown in the tables TB1 and TB2 of FIGS. 9 and 10 is used.

The example of the operation procedure of the monitoring system 100 described with reference to FIG. 11 is an operation procedure when the setting registration server S1 is omitted and the database DB1 is connected to the card reader control server S2 and the face detection server S3 so that the data communication is possible. The access control rule generated by the client server P1 is transmitted to the card reader control server S2 and then registered (stored) in the database DB1 by the card reader control server S2.

The client server P1 receives an administrator operation for the access control rule set for the card reader or the virtual reader (St11), and generates the access control rule for the card reader or the virtual reader. The client server P1 generates a control command for requesting setting of the access control rule, and transmits the generated access control rule and the control command in association with each other to the card reader control server S2 (St12). The access control rule shown in FIG. 11 is transmitted including a face image INF11 (an example of the card information) of the person that is permitted to access the "area A" by the "virtual reader A" in which the access control rule is set. The face image INF11 referred to here is each of the face images IM1 to IM3 shown in FIG. 9.

The client server P1 receives an administrator operation for setting an area to which the generated access control rule is applied (St13). The client server P1 generates a control command for requesting the setting of the access control rule in each area designated by the administrator operation, and transmits the area information to which the access control rule is applied and the control command in association with each other to the card reader control server S2 (St14).

The card reader control server S2, based on the control command transmitted from the client server P1, generates a control command for requesting setting of the access control rule in the card reader information of each of the plurality of card readers CR1 and so on registered in the database DB1, and a control command for requesting setting of the access control rule to be applied to the area information. The card reader control server S2 transmits the generated control commands, the access control rule, and the area information to which the access control rule is applied in association with each other to the database DB1 (St15).

The database DB1, based on the control commands transmitted from the card reader control server S2, stores (registers) the access control rule set in the card reader, the area information to which the access control rule is applied, and the camera information of the camera installed in the area corresponding to the area information (St16).

A camera CA monitors (images) the person accessing the "area A" (St17). The camera CA referred to here is the camera indicated by the camera information "camera A" in the table TB2 shown in FIG. 10, and is installed at a position where the person accessing the "area A" can be imaged. The "area A" referred to here is an area to which the access control rule set in the card reader information "virtual reader A" in the table TB2 shown in FIG. 10 is applied.

The camera CA detects whether a person appears in the captured image imaged at a time point "21:00" (St18). When the camera CA detects that the person appears in the captured image, the camera CA cuts out a region including a face region of the person to generate a face cut-out image IMG11 (St19). The camera CA transmits the generated face cut-out image IMG11 and the camera information of the camera CA in association with each other to the face detection server S3 (St20). An example in which two persons appearing in the face cut-out image IMG11 shown in FIG. 11 are identical persons as the face images IM2 and IM3 of the two persons shown in FIG. 9 will be described.

The face detection server S3, based on the camera information "camera A" transmitted from the camera CA, generates a control command for requesting transmitting the access control rule set in the camera information "camera A", and transmits the generated control command and the camera information in association with each other to the database DB1 (St21).

The database DB1, based on the control command transmitted from the face detection server S3, extracts the access control rule stored (registered) in association with the acquired camera information "camera A". Here, the access control rule includes face images INF12 of three persons that have the access permission by the card reader associated with the area where the camera CA is installed. The face image INF12 referred to here is each of the face images IM1 to IM3 shown in FIG. 9. The database DB1 transmits the extracted access control rule to the face detection server S3 (St22).

The face detection server S3 compares the face image INF12 (that is, each of the face images IM1 to IM3 shown in FIG. 9) included in the access control rule transmitted from the database DB1 with the face cut-out image IMG11, and determines whether there is a face image identical or similar to the two persons appearing in the face cut-out image IMG11 (St23).

Specifically, the face detection server S3 in the example shown in FIG. 11 determines that two persons appearing in the face cut-out image IMG11 are persons corresponding to the face images IM2 and IM3 shown in FIG. 9. In addition, the face detection server S3, based on the access control rule (access permission condition) set in the card reader information "virtual reader A", determines whether the two persons corresponding the face cut-out image IMG11 (that is, the persons corresponding to the face images IM2 and IM3) have the access permission at the time point "21:00" at which the face cut-out image IMG11 is imaged.

In the example shown in FIG. 11, two persons corresponding to the face image IM1 and the face image IM2 have the access permission in all time periods (that is, 24 hours) in the "virtual reader A" as the access permission condition. On the other hand, the person corresponding to the face image IM3 has the access permission in the time period "8:00 to 20:00" in the "virtual reader A" as the access permission condition, and does not have the access permission at the time point "21:00" at which the face cut-out image IMG11 is imaged.

Therefore, the face detection server S3, based on the access control rule (access permission condition) set in the card reader information "virtual reader A", determines that the person corresponding to the face image IM3 among the two persons appearing in the face cut-out image IMG11 does not have the access permission, and generates an alert notifying that the person that does not have the access permission to the "area A" is detected. The face detection server S3 transmits the generated alert to the client server P1 (St24). When the face detection server S3 determines that the detected person has the access permission, the face detection server S3 omits generation of an alert notification.

The client server P1 generates the alert notification screen SC1 based on the alert transmitted from the face detection server S3, outputs the alert notification screen SC1 to the display DP, and displays the alert notification screen SC1 on the display DP (St25). The alert notification screen SC1 is generated including the area information ("area A" in the example shown in FIG. 11) in which the person that does not have the access permission is detected and a face cut-out image of the person that does not have the access permission. It is needless to say that the alert notification screen SC1 shown in FIG. 11 is merely an example, and the present invention is not limited thereto.

As described above, even in the area where the card reader is not installed, the monitoring system 100 according to the first embodiment can generate and set the access control rule for monitoring the person accessing the area designated by the administrator by generating the access control rule including the card information of the virtual reader. In addition, the monitoring system 100 can monitor the person accessing the area where the card reader is not installed, based on the set access control rule.

Figure 12:
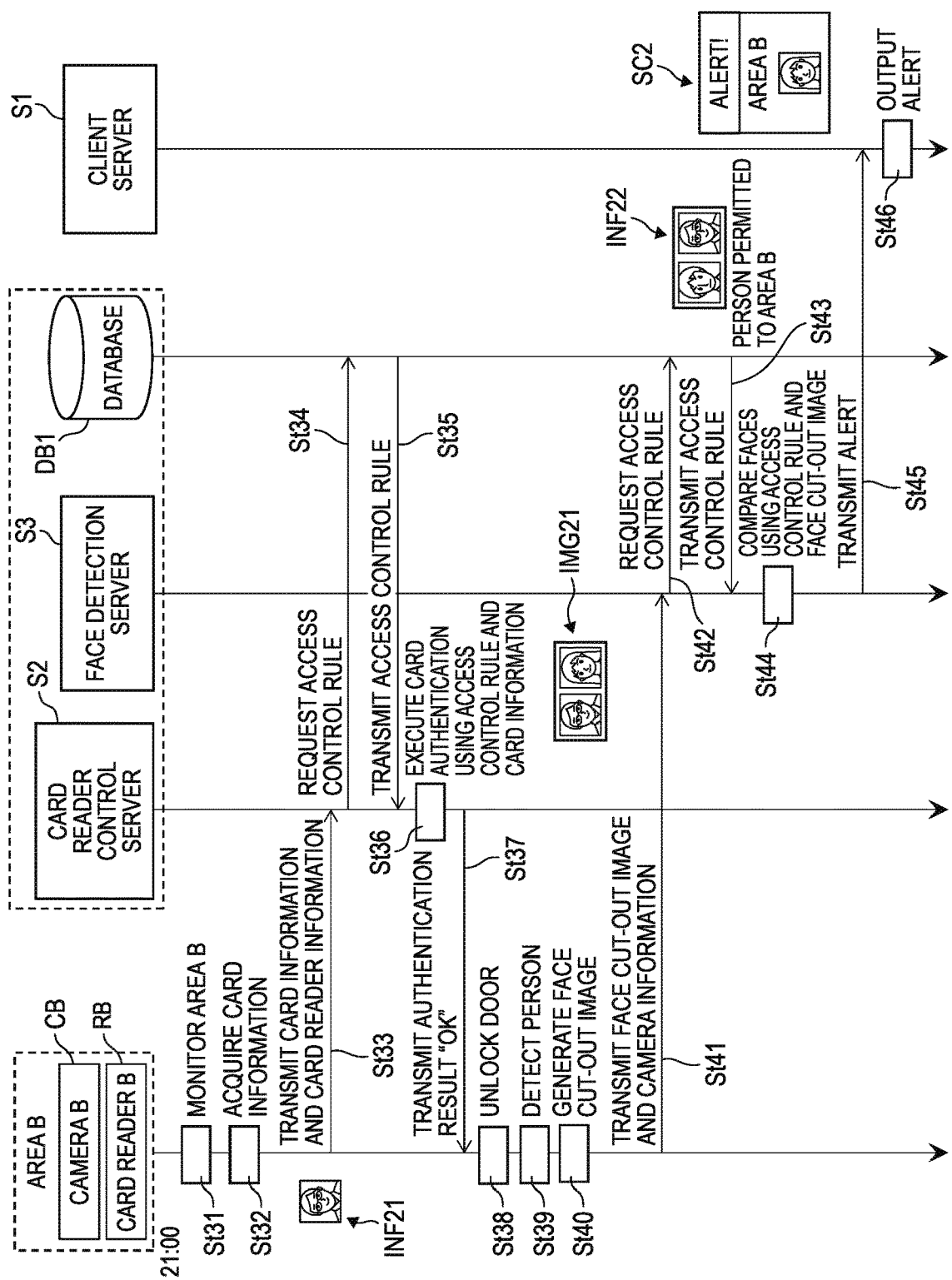
FIG. 12 is a sequence diagram showing an example of the operation procedure of the monitoring system according to the first embodiment.

Next, an operation procedure of the monitoring system 100 will be described with reference to FIG. 12. FIG. 12 is a sequence diagram showing an example of the operation procedure of the monitoring system 100 according to the first embodiment. The operation procedure of the monitoring system 100 described with reference to FIG. 12 will be described as an example of the operation procedure of the monitoring system 100 when the access control rule shown in the tables TB1 and TB2 of FIGS. 9 and 10 is used.

A camera CB monitors (images) the person accessing the "area B" (St31). The camera CB referred to here is the camera indicated by the camera information "camera B" in the table TB2 shown in FIG. 10, and is installed at a position where the person accessing the "area B" can be imaged. The "area B" referred to here is an area to which the access control rule set in the card reader information "card reader B" in the table TB2 shown in FIG. 10 is applied.

A card reader RB reads and acquires card information INF21 from a card presented in a readable distance (St32). The card reader RB transmits the acquired card information INF21 and the card reader information "card reader B" in association with each other to the card reader control server S2 (St33). The card reader RB referred to here is a card reader indicated by "card reader B" in FIGS. 9 and 10, and is installed near a door for accessing the "area B". In addition, although the card information in the example shown in FIG. 12 is an example of the face image of the cardholder as an example, it is needless to say that the present invention is not limited thereto.

The card reader control server S2, based on the card reader information "card reader B" transmitted from the card reader RB, generates a control command for requesting the access control rule set in the card reader information "card reader B". The card reader control server S2 transmits the generated control command and the card reader information "card reader B" in association with each other to the database DB1 (St34).

The database DB1, based on the control command transmitted from the card reader control server S2, extracts the access control rule set in the card reader information "card reader B". The database DB1 transmits the extracted access control rule to the card reader control server S2 (St35).

The card reader control server S2 executes card authentication based on the access control rule transmitted from the database DB1 and the acquired card information INF21 (that is, the face image of the cardholder) (St36). Specifically, the card reader control server S2 determines whether the acquired card information INF21 is in one or more pieces of card information that permits access included in the access control rule. In the example shown in FIG. 12, an example is described in which the acquired card information INF21 is in one or more pieces of card information that permits access included in the access control rule (that is, a card authentication result being "OK").

The card reader control server S2 generates a control command for unlocking the door, in which the authentication result of the card authentication is "OK", and transmits the control command to the card reader RB (St37).

The card reader RB unlocks the door based on the control command transmitted from the card reader control server S2 (St38).

The camera CB images the person accessing the "area B" from the door on which the card reader RB is installed. The camera CB detects whether a person appears in the captured image imaged at the time point "21:00" (St39). When the camera CB detects that the person appears in the captured image, the camera CB cuts out a region including a face region of the person to generate a face cut-out image IMG21 (St40). The camera CB transmits the generated face cut-out image IMG21 and the camera information of the camera CB in association with each other to the face detection server S3 (St41). Two persons appearing in the face cut-out image IMG21 shown in FIG. 12 are identical persons as the face images IM2 and IM3 of the two persons shown in FIG. 9.

The face detection server S3, based on the camera information "camera B" transmitted from the camera CB, generates a control command for requesting transmitting the access control rule set in the camera information "camera B", and transmits the generated control command and the camera information in association with each other to the database DB1 (St42).

The database DB1, based on the control command transmitted from the face detection server S3, and extracts the access control rule stored (registered) in association with the acquired camera information "camera B". Here, the access control rule includes face images INF22 of three persons that have the access permission by the card reader associated with the area where the camera CB is installed. The face image INF22 referred to here is each of the face images IM1 and IM2 of the two persons shown in FIG. 9. The database DB1 transmits the extracted access control rule to the face detection server S3 (St43).

The face detection server S3 compares the face image INF22 (that is, each of the face images IM1 and IM2 shown in FIG. 9) included in the access control rule transmitted from the database DB1 with the face cut-out image IMG21, and determines whether there is a face image identical or similar to two persons appearing in the face cut-out image IMG21 (St44).

Specifically, the face detection server S3 in the example shown in FIG. 12 determines that two persons appearing in the face cut-out image IMG21 are persons corresponding to the face images IM2 and IM3 shown in FIG. 9. In addition, the face detection server S3, based on the access control rule (access permission condition) set in the card reader information "card reader B", determines whether the two persons corresponding the face cut-out image IMG21 (that is, persons corresponding to the face images IM2 and IM3) have the access permission at the time point "21:00" at which the face cut-out image IMG21 is imaged.

In the example shown in FIG. 12, the person corresponding to the face image IM1 has the access permission in all time periods (that is, 24 hours) in the "card reader B" as the access permission condition. In addition, the person corresponding to the face image IM2 has the access permission in the time period "8:00 to 22:00" in the "card reader B", and also has the access permission at the time point "21:00" at which the face cut-out image IMG21 is imaged as the access permission condition. On the other hand, the person corresponding to the face image IM3 has the access permission in the time period "8:00 to 20:00" in the "card reader B", and does not have the access permission at the time point "21:00" at which the face cut-out image IMG21 is imaged as the access permission condition.

Therefore, the face detection server S3, based on the access control rule (access permission condition) set in the card reader information "card reader B", determines that the person corresponding to the face image IM3 among the two persons appearing in the face cut-out image IMG21 does not have the access permission, and generates an alert notifying that the person that does not have the access permission to the "area B" is detected. The face detection server S3 transmits the generated alert to the client server P1 (St45). When the face detection server S3 determines that the detected person has the access permission, the face detection server S3 omits the generation of the alert notification.

The client server P1 generates the alert notification screen SC2 based on the alert transmitted from the face detection server S3, outputs the alert notification screen SC2 to the display DP, and displays the alert notification screen SC2 on the display DP (St46). The alert notification screen SC2 is generated including the area information ("area B" in the example shown in FIG. 12) in which the person that does not have the access permission is detected and a face cut-out image of the person that does not have the access permission. It is needless to say that the alert notification screen SC2 shown in FIG. 12 is merely an example, and the present invention is not limited thereto.

As described above, the monitoring system 100 according to the first embodiment can generate and set the access control rule for monitoring the person accessing the area where the card reader is installed similarly.

Figure 13:
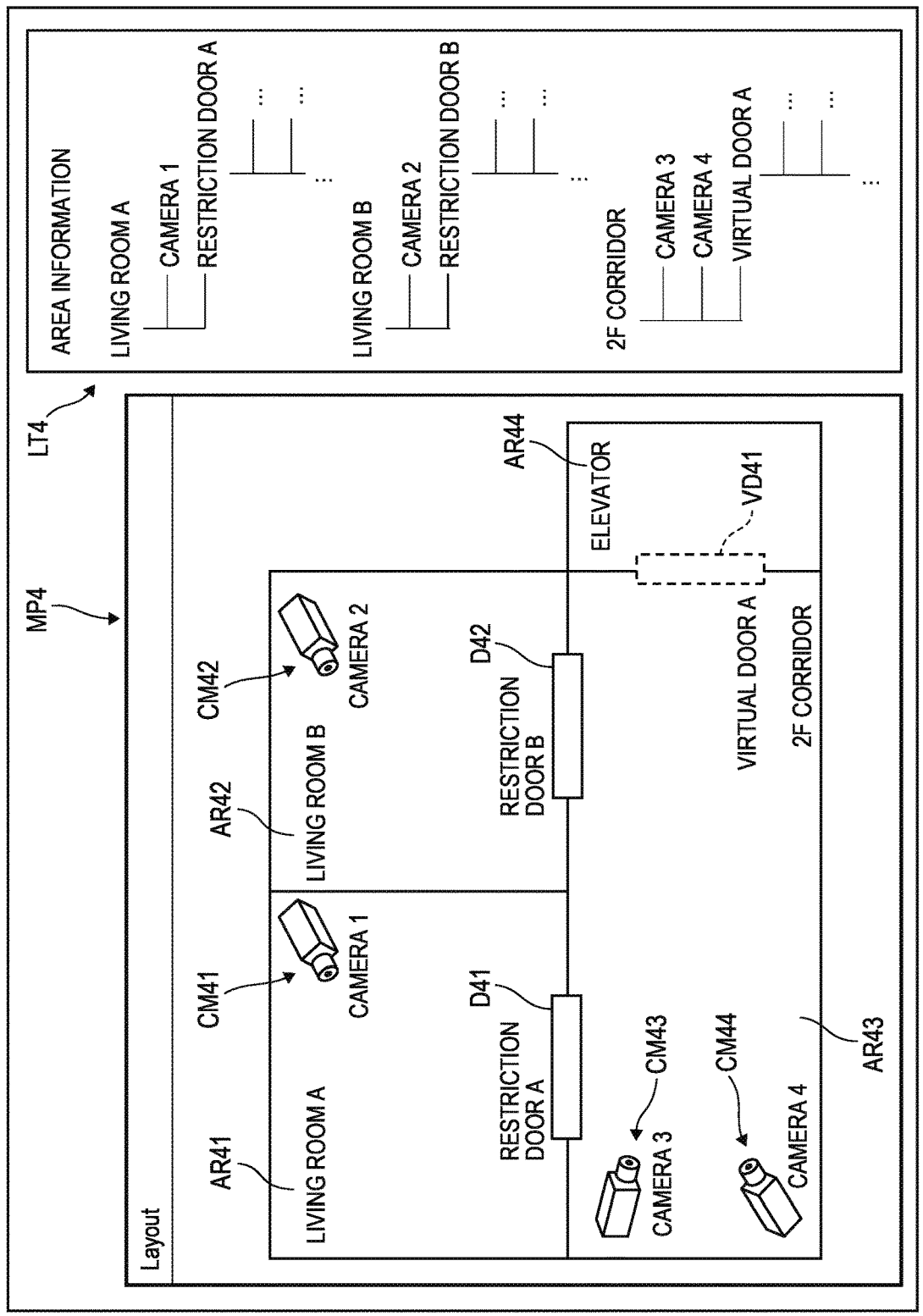
FIG. 13 is a diagram showing an example of the access control rule.

An example of the access control rule generated by the monitoring system 100 according to the first embodiment will be described with reference to FIG. 13. An example in which the access control rule shown in FIG. 13 is set using the floor map or the area map described with reference to FIG. 7 will be described. It is needless to say that the access control rule shown in FIG. 13 is merely an example, and the present invention is not limited thereto. In addition, in the access control rule shown in FIG. 13, in order to simplify the description, the person information, the card information, the face image of the person, and the like that permit access are omitted.

In a floor map image MP4, a camera, a card reader, a virtual reader, and the like are disposed on at least one area as the monitoring target by an administrator operation. The floor map image MP4 visualizes relationship among the card reader or the virtual reader in which the access control rule is set, the area to which the access control rule is applied, and the camera that monitors (images) the area as the monitoring target.

The floor map image MP4 shown in FIG. 13 includes four areas AR41, AR42, AR43, and AR44, camera icons CM41, CM42, CM43, and CM44 indicating each of a plurality of cameras, card reader icons D41 and D42 indicating each of a plurality of card readers, and a virtual reader icon VD41 indicating the virtual reader.

When the card reader or the virtual reader and the camera are disposed on the floor map image MP4 by the administrator operation, an area information field LT4, based on arrangement relationship among the area and the card reader or the virtual reader and the camera, visualizes relationship among the area information as the monitoring target, the card reader information of the card reader or the virtual reader in which the access control rule is set, and the camera information for imaging the area as the monitoring target, using character information.

Each of three access control rules shown in FIG. 13 will be described. A first access control rule is set to a card reader "restriction door A" that permits access to an area "living room A". The area "living room A" is monitored (imaged) by a camera "camera 1". A second access control rule is set to a card reader "restriction door B" that permits access to an area "living room B". The area "living room B" is monitored (imaged) by a camera "camera 2". A third access control rule is set to a card reader "virtual door A" that permits access to an area "2F corridor". The area "2F corridor" is monitored (imaged) by two cameras "camera 3" and "camera 4".

As described above, in the example shown in FIG. 13, the monitoring system 100 according to the first embodiment can monitor whether the person accessing the area "living room A" in which the card reader is installed with the camera "camera 1" has the access permission, and can monitor whether the person accessing the "living room B" has the access permission with the camera "camera 2". In addition, the monitoring system 100 according to the first embodiment can create and use the access control rule (that is, monitor) for monitoring whether the person accessing the area "2F corridor" in which the card reader is not installed from an area "elevator" has the access permission with each of two cameras "camera 3" and "camera 4". Therefore, when it is desired to monitor the area where the card reader is not installed, the administrator can flexibly set the access control rule for monitoring the person accessing the area "2F corridor" and monitor the area without deploying a guard or the like.

Figure 14:
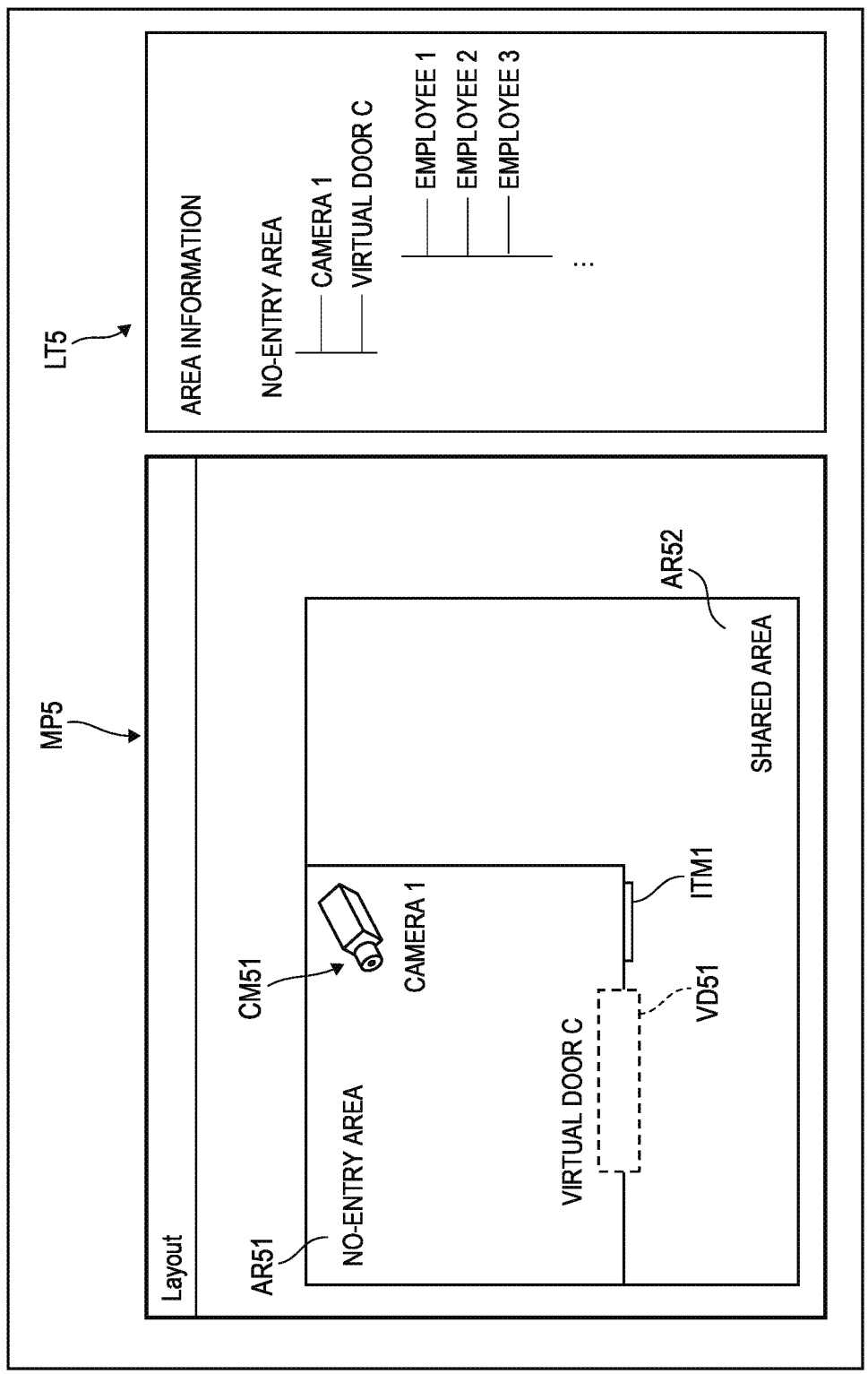
FIG. 14 is a diagram showing an example of the access control rule.

An example of the access control rule generated by the monitoring system 100 according to the first embodiment will be described with reference to FIG. 14. An example in which the access control rule shown in FIG. 14 is set using the floor map or the area map described with reference to FIG. 7 will be described. It is needless to say that the access control rule shown in FIG. 14 is merely an example, and the present invention is not limited thereto. In addition, in the access control rule shown in FIG. 14, in order to simplify the description, the card information, the face image of the person, and the like that permit access are omitted.

In a floor map image MP5, a camera, a card reader, a virtual reader, and the like are disposed on at least one area as the monitoring target by an administrator operation. The floor map image MP5 visualizes relationship among the card reader or the virtual reader in which the access control rule is set, the area to which the access control rule is applied, and the camera that monitors (images) the area as the monitoring target.

The floor map image MP5 shown in FIG. 14 includes two areas AR51 and AR52, a camera icon CM51 indicating one camera, and a virtual reader icon VD51 indicating the virtual reader. The floor map image MP5 shown in FIG. 14 shows a sticker icon ITM1 for the sake of clarity, but the sticker icon ITM1 may be omitted.

When the card reader or the virtual reader and the camera are disposed on the floor map image MP5 by the administrator operation, an area information field LT5, based on arrangement relationship among the area and the card reader or the virtual reader and the camera, visualizes relationship among the area information as the monitoring target, the card reader information of the card reader or the virtual reader in which the access control rule is set, and the camera information for imaging the area as the monitoring target, using character information. In the example shown in FIG. 14, a virtual reader "virtual door C" permits access of each of persons "employee 1", "employee 2", "employee 3" and so on.

One access control rule shown in FIG. 14 will be described. The access control rule shown in FIG. 14 is set to a virtual reader "virtual door C" that allows access to an area "no-entry area". The area "no-entry area" is monitored (imaged) by the camera "camera 1".

As described above, in the example shown in FIG. 14, the monitoring system 100 according to the first embodiment can set the access control rule in the area "no-entry area" even when it is desired to monitor entry other than a specific person to the area "no-entry area" in which the card reader is temporarily not installed due to a predetermined situation (for example, construction, inspection work, layout change, or the like). Accordingly, the monitoring system 100 can monitor whether the person accessing the area "no-entry area" in which the card reader is not installed from an area "shared area" has the access permission with the camera "camera 1". That is, the administrator can not only restrict access of unspecified number of people by actually putting a sticker (a sticker corresponding to the sticker icon ITM1 shown in FIG. 14) near a doorway of the area "no-entry area", but also monitor whether the person accessing the area "no-entry area" has the access permission. Therefore, even when it is desired to monitor the area where the card reader is not installed, the administrator can flexibly set the access control rule for monitoring the person accessing the area "no-entry area" and monitor the area without deploying a guard or the like.

As described above, the client server P1 as an example of the monitoring area setting device according to the first embodiment includes: the memory 12 or the database DB1 (an example of the storage unit) that stores information of at least one area and the card reader information of the card reader corresponding to the area; the operation unit IF (an example of the input unit) configured to receive the administrator operation; and the processor 11 configured to, based on the administrator operation, generate the access control rule including the information of the monitoring area to be monitored by at least one camera in the area and the person information of at least one person that allows access to the monitoring area. The processor 11 is configured to, when the card reader information corresponding to the monitoring area is input by the administrator operation, generate the access control rule further including the card reader information, and when the card reader information corresponding to the monitoring area is not input by the administrator operation, generate the card reader information of the virtual reader designated by the administrator operation for access to the monitoring area, and generate the access control rule further including generated card reader information of the virtual reader.

Accordingly, the client server P1 according to the first embodiment can flexibly set an area as the monitoring target and the access control rule without being affected by presence or absence of the card reader. Accordingly, the client server P1 can support a monitoring operation of the area as the monitoring target by the administrator more efficiently.

In addition, as described above, the memory 12 in the client server P1 according to the first embodiment stores the face image of the person as the person information. The processor 11 is configured to, when the access control rule is an access control rule including the card reader information of the virtual reader, generate the access control rule including the face image of the person that allows access to the monitoring area. Accordingly, the client server P1 according to the first embodiment can generate the access control rule that enables determination as to whether there is access permission based on the face image of the person even in the area where the card reader is not installed.

In addition, as described above, the memory 12 in the client server P1 according to the first embodiment stores, as the person information, the face image of the person and the card information of the person readable by the card reader. The processor 11 is configured to, when the access control rule is an access control rule including the card reader information, generate the access control rule including the face image and the card information of the person that allow access to the monitoring area. Accordingly, the client server P1 according to the first embodiment, when the card reader is installed, even in the area where the card reader is installed, can generate the access control rule that enables unlocking determination of the card reader based on the card information and determination of whether there is the access permission based on the face image of the person.

In addition, as described above, the access control rule generated by the client server P1 according to the first embodiment includes information of a date and time or a time period that allows access to the monitoring area for each piece of person information. Accordingly, the client server P1 according to the first embodiment can set a detailed access permission condition for each person.

As described above, the face detection server S3 according to the first embodiment is communicably connected to one or more cameras that image the monitoring area. The face detection server S3 acquires an access control rule including information of the monitoring area to be monitored by at least one camera, the person information and the face image of at least one person that is allowed to access the monitoring area, and the card reader information corresponding to the monitoring area. The face detection server S3, when the access control rule includes the card reader information of the virtual reader designated by the administrator operation for access to the monitoring area, acquires the face image of the person accessing the monitoring area imaged by the camera; determines whether an acquired face image of the person is in the face image included in the access control rule; and generates, when it is determined that the face image of the person is not in the face image included in the access control rule, the alert indicating that a person that is not allowed to access the monitoring area is detected, and outputting the alert, and when the access control rule does not include the card reader information of the virtual reader, acquires the face image of the person accessing the monitoring area that is imaged by the camera and that allows access by the card reader corresponding to the card reader information; determines whether an acquired face image of the person is in the face image included in the access control rule; and generates, when it is determined that the face image of the person is not in the face image included in the access control rule, the alert indicating that a person that is not allowed to access the monitoring area is detected, and outputting the alert.

Accordingly, the face detection server S3 according to the first embodiment monitors the area as the monitoring target based on the access control rule, regardless of whether the access control rule including the card reader information of the card reader or the access control rule including the card reader information of the virtual reader, and outputs the alert when the person that does not have the access permission is detected. Therefore, the face detection server S3 can support the monitoring operation of the area as the monitoring target by the administrator more efficiently.

As described above, the face detection server S3 according to the first embodiment is communicably connected to one or more cameras that image the monitoring area. The face detection server S3 acquires the access control rule including information of the monitoring area to be monitored by at least one camera, the person information and the face image of at least one person that allows access to the monitoring area, and the card reader information corresponding to the monitoring area. The face detection server S3, when the access control rule includes the card reader information of the virtual reader designated by the administrator operation for access to the monitoring area, acquires the face image of the person accessing the monitoring area imaged by the camera; determines whether an acquired face image of the person is in the face image included in the access control rule; and generates, when it is determined that the face image of the person is not in the face image included in the access control rule, the alert indicating that a person that is not allowed to access the monitoring area is detected, and outputting the alert, and when the access control rule does not include the card reader information of the virtual reader, reads the person information from the card held by the person accessing the monitoring area by the card reader corresponding to the card reader information; unlocks the card reader when read person information is the person information included in the access control rule; acquires the face image of the person accessing the monitoring area imaged by the camera; determines whether an acquired face image of the person is in the face image included in the access control rule; and generates, when it is determined that the face image of the person is not in the face image included in the access control rule, the alert indicating that a person that is not allowed to access the monitoring area is detected, and outputting the alert.

Accordingly, the face detection server S3 according to the first embodiment monitors the area as the monitoring target based on the access control rule, regardless of whether the access control rule including the card reader information of the card reader or the access control rule including the card reader information of the virtual reader, and outputs the alert when the person that does not have the access permission is detected. Therefore, the face detection server S3 can support the monitoring operation of the area as the monitoring target by the administrator more efficiently.

Although various embodiments have been described with reference to the accompanying drawings, the present disclosure is not limited to examples in the embodiments. It will be apparent to those skilled in the art that various changes, modifications, substitutions, additions, deletions, and equivalents can be conceived within the scope of the claims, and it should be understood that these changes, modifications, substitutions, additions, deletions, and equivalents also belong to the technical scope of the present invention. Components in various embodiments described above may be combined freely within a range without deviating from the spirit of the invention.

INDUSTRIAL APPLICABILITY

The present disclosure is useful as presentation of a monitoring area setting device, a monitoring area setting program, a monitoring area setting method, an alert notification program, and an alert notification method that enable flexible setting of a monitoring area and that more efficiently support a monitoring operation of an administrator.

What is claimed is:

1. A monitoring area setting device comprising:
a storage configured to store information of at least one monitoring area and card reader information of a card reader corresponding to one of the at least one monitoring area;
an input unit configured to receive an administrator operation; and
a processor configured to, based on the administrator operation, generate an access control rule including information of the at least one monitoring area to be monitored by at least one camera in the at least one monitoring area and person information of at least one person who is allowed to access the at least one monitoring area, wherein
the processor is configured to,
display person information of a person in a first region on a display and first card reader information of a first card reader corresponding to a first monitoring area to be monitored by a first camera, the first card reader information being displayed in a first sub-region of a second region on the display,
receive the administrator operation of dragging the person information of the person displayed on the display,
determine whether the dragged person information of the person is dropped in the first sub-region of the second region for the first card reader information of the first card reader,
when the dragged person information of the person is dropped in the first sub-region of the second region for the first card reader information of the first card reader, generate a first access control rule including the first card reader information of the first card reader associated with the dragged person information of the person, to allow the person to access the first monitoring area, and
when the dragged person information of the person is dropped in a second sub-region of the second region other than the first sub-region, generate second card reader information of a virtual reader designated by the administrator operation for access to a second monitoring area to be monitored by a second camera, and generate a second access control rule including the generated second card reader information of the virtual reader associated with the dragged person information of the person, and associated with an access permission condition indicating a time period, to allow the person to access the second monitoring area in the time period indicated by the access permission condition.

2. The monitoring area setting device according to claim 1, wherein
the storage stores a face image of a person as the person information, and
the processor is configured to, when the second access control rule includes the second card reader information of the virtual reader, generate the second access control rule including the face image of the person, to allow the person to access the second monitoring area.

3. The monitoring area setting device according to claim 1, wherein
the storage stores, as the person information, a face image of a person and card information of the person that is able to be read by the first card reader, and
the processor is configured to, when the first access control rule includes the first card reader information of the first card reader, generate the first access control rule including the face image and the card information of the person, to allow the person to access the first monitoring area.

4. The monitoring area setting device according to claim 1, wherein
the second access control rule for the second card reader information of the virtual reader includes a first table and a second table,
in the first table, the second card reader information of the virtual card reader is associated with the information of the person and the access permission condition indicating the date and the time period which the person is allowed to access the second monitoring area, and
in the second table, the second monitoring area is associated with the second card reader information of the virtual reader and information of the second camera.

5. The monitoring area setting device according to claim 1, wherein the processor is further configured to
display the first card reader information of the first card reader and the second card reader information of the virtual reader in a third region on the display after the second access control rule for the virtual reader is generated;
display information of the first monitoring area and the second monitoring area respectively in a first sub-region and a second sub-region of a fourth region on the display; and
when the second card reader information of the virtual card reader is dragged and dropped in the second sub-region of the fourth region, store, in the storage, the second card reader information of the virtual reader in association with information of the second monitoring area.

6. A monitoring area setting method performed by a monitoring area setting device that is communicably connected to a computer that monitors a person accessing a monitoring area, the monitoring area setting method comprising:
displaying person information of a person in a first region on a display and first card reader information of a first card reader corresponding to a first monitoring area to be monitored by a first camera, the first card reader information being displayed in a first sub-region of a second region on the display, receiving an administrator operation of dragging the person information of the person displayed on the display, determining whether the dragged person information of the person is dropped in the first sub-region of the second region for the first card reader information of the first card reader, when the dragged person information of the person is dropped in the first sub-region of the second region for the first card reader information of the first card reader, generating a first access control rule including the first card reader information of the first card reader associated with the dragged person information of the person, to allow the person to access the first monitoring area; and when the dragged person information of the person is dropped in a second sub-region of the second region other than the first sub-region, generating second card reader information of a virtual reader designated by an administrator operation for access to a second monitoring area to be monitored by a second camera and generating a second access control rule including the generated second card reader information of the virtual reader associated with the dragged person information of the person, and associated with an access permission condition indicating a time period, to allow the person to access the second monitoring area in the time period indicated by the access permission condition.

7. A non-transitory computer readable storage medium storing a monitoring area setting program, the program, when executed by a computer, causing the computer to perform operations comprising:

displaying person information of a person in a first region on a display and first card reader information of a first card reader corresponding to a first monitoring area to be monitored by a first camera, the first card reader information being displayed in a first sub-region of a second region on the display, receiving an administrator operation of dragging the person information of the person displayed on the display, determining whether the dragged person information of the person is dropped in the first sub-region of the second region for the first card reader information of the first card reader, when the dragged person information of the person is dropped in the first sub-region of the second region for the first card reader information of the first card reader, generating a first access control rule including the first card reader information of the first card reader associated with the dragged person information of the person, to allow the person to access the first monitoring area, and when the dragged person information of the person is dropped in a second sub-region of the second region other than the first sub-region, generating second card reader information of a virtual reader designated by an administrator operation for access to a second monitoring area to be monitored by a second camera and generating a second access control rule including the generated second card reader information of the virtual reader associated with the dragged person information of the person, and associated with an access permission condition indicating a time period, to allow the person to access the second monitoring area in the time period indicated by the access permission condition.

\* \* \* \* \*